(12) United States Patent
Delp et al.

(10) Patent No.: US 11,784,949 B2
(45) Date of Patent: Oct. 10, 2023

(54) LIMITED FUNCTIONALITY INTERFACE FOR COMMUNICATION PLATFORM

(71) Applicant: Salesforce, Inc., San Francisco, CA (US)

(72) Inventors: Shanan Delp, San Francisco, CA (US); Michael Demmer, San Francisco, CA (US); Ilan Frank, Los Altos, CA (US); Kevin Marshall, Mill Valley, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/948,939

(22) Filed: Oct. 6, 2020

(65) Prior Publication Data

US 2022/0109645 A1    Apr. 7, 2022

(51) Int. Cl.
*H04L 12/58* (2006.01)
*H04L 29/08* (2006.01)
(Continued)

(52) U.S. Cl.
CPC .......... *H04L 51/046* (2013.01); *G06F 3/0482* (2013.01); *G06F 21/31* (2013.01);
(Continued)

(58) Field of Classification Search
CPC . H04L 51/046; H04L 65/1069; H04L 65/403; H04L 67/306; G06F 3/0482; G06F 21/31
See application file for complete search history.

(56) References Cited

U.S. PATENT DOCUMENTS 7,610,339 B2   10/2009   Evans et al.
7,707,249 B2   4/2010    Spataro et al.
(Continued)

FOREIGN PATENT DOCUMENTS

JP   2003030101 A    1/2003
JP   20033219047 A   7/2003
(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
(Continued)

*Primary Examiner* — Tadesse Hailu
*Assistant Examiner* — Darrin Hope
(74) *Attorney, Agent, or Firm* — Lee & Hayes, P.C.

(57) ABSTRACT

Techniques are described for expediting communications between a first person of an organization associated with a communication platform and a second person not associated with the organization. The first person requests for the communication platform to generate an invitation to communicate with the second person. The first person provides the invitation to the second person directly or via the communication platform. Responsive to receiving an indication that the second person accepts the invitation, the communication platform identifies whether the second person is associated with the communication platform. If the second user is associated with the communication platform, the communication platform modifies an existing user interface associated therewith to enable communications between the first person and the second person. If the second person is not associated with the communication platform, the communication platform generates a limited functionality user interface to enable the communications between the first person and the second person.

20 Claims, 9 Drawing Sheets

(51) Int. Cl.

| | |
|---|---|
| H04L 29/06 | (2006.01) |
| G06F 3/0482 | (2013.01) |
| G06F 21/31 | (2013.01) |
| H04L 51/046 | (2022.01) |
| H04L 67/306 | (2022.01) |
| H04L 65/1069 | (2022.01) |
| H04L 65/403 | (2022.01) |

(52) U.S. Cl.
CPC ........ *H04L 65/1069* (2013.01); *H04L 65/403* (2013.01); *H04L 67/306* (2013.01)

(56) References Cited

U.S. PATENT DOCUMENTS

| | | | |
|---|---|---|---|
| 7,882,178 | B2 | 2/2011 | Lingalelt et al. |
| 8,600,027 | B1 | 12/2013 | Doerr et al. |
| 8,621,585 | B2 | 12/2013 | Danieli et al. |
| 8,655,672 | B2 | 2/2014 | Bhan et al. |
| 8,676,792 | B1 | 3/2014 | Scatamacchia et al. |
| 8,719,904 | B2 | 5/2014 | Bertin et al. |
| 8,738,714 | B2 | 5/2014 | Setton |
| 8,856,236 | B2 | 10/2014 | Moore et al. |
| 8,874,770 | B2 | 10/2014 | Ruff et al. |
| 9,032,033 | B2 | 5/2015 | Gronowski et al. |
| 9,209,992 | B2 | 12/2015 | Nelke et al. |
| 9,270,453 | B2 | 2/2016 | King et al. |
| 9,396,456 | B1 | 7/2016 | Wang et al. |
| 9,426,156 | B2 | 8/2016 | Hebert et al. |
| 9,449,091 | B1 | 9/2016 | Rao et al. |
| 9,483,448 | B2 | 11/2016 | Pimazar |
| 9,600,669 | B2 | 3/2017 | Filman et al. |
| 9,654,425 | B2 | 5/2017 | Heiferman et al. |
| 9,819,803 | B2 | 11/2017 | Logan et al. |
| 9,820,152 | B2 | 11/2017 | Myers et al. |
| 9,853,980 | B2 | 12/2017 | Radier et al. |
| 9,973,552 | B2 | 5/2018 | Lappin |
| 10,021,059 | B1 | 7/2018 | Rao |
| 10,033,702 | B2 | 7/2018 | Ford et al. |
| 10,104,034 | B1 | 10/2018 | Coullon et al. |
| 10,116,995 | B2 | 10/2018 | Eklund et al. |
| 10,264,095 | B2 | 4/2019 | La Rotonda et al. |
| 10,269,033 | B2 | 4/2019 | Znerold et al. |
| 10,282,740 | B1 | 5/2019 | Bramwell et al. |
| 10,311,037 | B2 | 6/2019 | Turim et al. |
| 10,313,294 | B2 | 6/2019 | Maczka et al. |
| 10,348,731 | B2 | 7/2019 | Jayaram et al. |
| 10,389,765 | B2 | 8/2019 | Zeng et al. |
| 10,397,391 | B1 | 8/2019 | Czajka et al. |
| 10,404,636 | B2 | 9/2019 | Rodriguez et al. |
| 10,430,051 | B2 | 10/2019 | Zeng et al. |
| 10,455,291 | B2 | 10/2019 | Bernstein et al. |
| 10,510,035 | B2 | 12/2019 | Fadell et al. |
| 10,530,723 | B2 | 1/2020 | Milligan et al. |
| 10,540,638 | B2 | 1/2020 | Agarwal et al. |
| 10,565,276 | B2 | 2/2020 | Finder |
| 10,579,969 | B2 | 3/2020 | Johnson et al. |
| 10,616,278 | B1 | 4/2020 | Johansson et al. |
| 10,616,369 | B1 | 4/2020 | d'Andrea et al. |
| 10,673,912 | B2 | 6/2020 | Houchen et al. |
| 10,681,095 | B1 | 6/2020 | Wang et al. |
| 10,720,001 | B1 | 7/2020 | Grosberg |
| 10,721,225 | B1 | 7/2020 | Baszucki et al. |
| 10,728,187 | B2 | 7/2020 | Roy et al. |
| 10,737,169 | B1 | 8/2020 | Tilaye et al. |
| 10,783,573 | B2 | 9/2020 | Eubanks |
| 10,785,809 | B1 | 9/2020 | Thubert et al. |
| 10,904,481 | B1 | 1/2021 | Morris et al. |
| 10,904,749 | B2 | 1/2021 | Circosta et al. |
| 11,005,990 | B2 | 5/2021 | Kats et al. |
| 11,017,416 | B2 | 5/2021 | Kopikare et al. |
| 11,120,409 | B1 | 9/2021 | Worth |
| 11,283,857 | B2 | 3/2022 | Ziebell et al. |
| 11,424,995 | B1 | 8/2022 | Cartsonis et al. |
| 2002/0078150 | A1 | 6/2002 | Thompson et al. |
| 2005/0021625 | A1* | 1/2005 | Fujimura ................ H04N 7/15 348/E7.083 |
| 2007/0192410 | A1 | 8/2007 | Liversidge et al. |
| 2010/0017619 | A1 | 1/2010 | Errico |
| 2010/0299763 | A1* | 11/2010 | Marcus ................ G06Q 10/06 726/30 |
| 2013/0254296 | A1* | 9/2013 | Lai ........................ H04L 65/40 709/205 |
| 2013/0298006 | A1 | 11/2013 | Good et al. |
| 2013/0326362 | A1 | 12/2013 | Murray et al. |
| 2014/0052485 | A1* | 2/2014 | Shidfar ................ G06Q 50/01 705/7.13 |
| 2014/0096033 | A1 | 4/2014 | Blair |
| 2014/0344718 | A1 | 11/2014 | Rapaport et al. |
| 2015/0067077 | A1 | 3/2015 | DiSano et al. |
| 2015/0081532 | A1 | 3/2015 | Lewis et al. |
| 2015/0100503 | A1 | 4/2015 | Lobo et al. |
| 2015/0201162 | A1 | 7/2015 | Griffin et al. |
| 2015/0288701 | A1 | 10/2015 | Brand |
| 2016/0017619 | A1 | 1/2016 | Pitbladdo |
| 2016/0036872 | A1 | 2/2016 | Lappin |
| 2016/0127282 | A1* | 5/2016 | Nezarati ............... G06F 3/0481 715/758 |
| 2016/0212230 | A1* | 7/2016 | Schneider ............. H04L 67/22 |
| 2017/0278155 | A1 | 9/2017 | Li et al. |
| 2017/0329922 | A1 | 11/2017 | Eberting et al. |
| 2017/0351476 | A1 | 12/2017 | Yoakum |
| 2017/0353508 | A1 | 12/2017 | Yoakum |
| 2018/0239959 | A1 | 8/2018 | Bui et al. |
| 2018/0287982 | A1 | 10/2018 | Draeger et al. |
| 2018/0294986 | A1 | 10/2018 | Vidro et al. |
| 2018/0302357 | A1 | 10/2018 | Cohen |
| 2019/0068390 | A1 | 2/2019 | Gross et al. |
| 2019/0180248 | A1 | 6/2019 | Byun et al. |
| 2019/0197231 | A1* | 6/2019 | Meier ................ H04L 63/0407 |
| 2019/0273627 | A1 | 9/2019 | Whalin et al. |
| 2019/0319900 | A1 | 10/2019 | Marlow et al. |
| 2019/0370457 | A1* | 12/2019 | Shultz ................. H04L 63/083 |
| 2019/0391861 | A1 | 12/2019 | Emerick et al. |
| 2019/0394206 | A1 | 12/2019 | Zezza |
| 2020/0100165 | A1 | 3/2020 | Hosier, Jr. |
| 2020/0228610 | A1 | 7/2020 | Fisher et al. |
| 2020/0285684 | A1 | 9/2020 | Halikka et al. |
| 2020/0329005 | A1 | 10/2020 | Anerella et al. |
| 2020/0338456 | A1 | 10/2020 | Atli et al. |
| 2020/0357246 | A1 | 11/2020 | Nelson et al. |
| 2020/0358645 | A1 | 11/2020 | Li et al. |
| 2021/0037064 | A1 | 2/2021 | Casey et al. |
| 2021/0211317 | A1 | 7/2021 | Khan et al. |
| 2021/0211477 | A1 | 7/2021 | Stephenson |
| 2021/0234827 | A1 | 7/2021 | Waldman et al. |
| 2021/0328957 | A1 | 10/2021 | Delp et al. |
| 2022/0210104 | A1 | 6/2022 | Delp et al. |

FOREIGN PATENT DOCUMENTS

| | | |
|---|---|---|
| JP | 2020030851 A | 2/2020 |
| WO | WO2016139977 A1 | 9/2016 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", FORBES, [online][retrieved May 9, 2019]. Retrieved from the Internet: <URL https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved

(56) References Cited

OTHER PUBLICATIONS

May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", GIGAOM, Lexisnexis, https://advance.lexis.com/api/pemnalink/0b676b7c-aec34560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", FUJITSU Sci. Tech. J., 36, 2, (Dec. 2000) pp. 154-161.
Office Action for U.S. Appl. No. 16/852,202, dated Jun. 24, 2020, Delp, "Direct Messaging Instance Generation", 10 pages.
Oikarinen, J. & Reed, D., "Internet Relay Chat Protocol", Request for Comments: 1459, Network Working Group, [online][retrieved May 30, 2019], Retrieved from the Internet: <URL: https://www.rfc-editor.org/rfc/rfc1459.txt>. (dated May 1993) 57 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/> (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", GIGAOM, Lexisnexis, https://advance.lexis.com/api/permalink/e83//8c8-09c8-43aa-9ba0-88526283de69/?context= 1000516, (dated Aug. 1, 2014, 5:45 PM) 4 pages.
Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.
PCT Search Report and Written Opinion.
The International Preliminary Report on Patentability dated Oct. 27, 2022 for PCT Application No. PCT/US2021/027130, 10 pages.
Japanese Office Action dated Apr. 18, 2023 for Japanese patent application No. 2022-555123, a foreign counterpart of U.S. Pat. No. 10,951,564, 9 pages.

* cited by examiner

600 ↘

```
┌─────────────────────────────────────────────────────────────────────────────┐
│ RECEIVE, FROM A FIRST COMPUTING DEVICE ASSOCIATED WITH A FIRST USER, A FIRST INPUT CORRESPONDING │
│ TO ACCEPTANCE OF AN INVITATION, WHEREIN THE INVITATION ENABLES COMMUNICATIONS WITH A SECOND     │
│ USER VIA A COMMUNICATION PLATFORM AND WHEREIN THE FIRST INPUT INCLUDES A FIRST USER IDENTIFIER  │
│                          ASSOCIATED WITH THE FIRST USER                                         │
│                                        602                                                      │
└─────────────────────────────────────────────────────────────────────────────┘
                                         ↓
┌─────────────────────────────────────────────────────────────────────────────┐
│ DETERMINE, BASED AT LEAST IN PART ON THE FIRST USER IDENTIFIER, THAT THE FIRST USER IS NOT      │
│ ASSOCIATED WITH THE COMMUNICATION PLATFORM OR THAT THE FIRST USER IS ASSOCIATED WITH A LIMITED  │
│                  FUNCTIONALITY USER INTERFACE OF THE COMMUNICATION PLATFORM                     │
│                                        604                                                      │
└─────────────────────────────────────────────────────────────────────────────┘
                                         ↓
┌─────────────────────────────────────────────────────────────────────────────┐
│ SEND, TO THE FIRST COMPUTING DEVICE, A FIRST USER INTERFACE INCLUDING A DIRECT MESSAGING INSTANCE │
│ OR A COMMUNICATION CHANNEL THAT ENABLE THE COMMUNICATIONS BETWEEN THE FIRST USER AND THE        │
│ SECOND USER VIA THE COMMUNICATION CHANNEL, WHEREIN THE FIRST USER INTERFACE COMPRISES A FIRST   │
│                                     FUNCTIONALITY                                               │
│                                        606                                                      │
└─────────────────────────────────────────────────────────────────────────────┘
                                         ↓
┌─────────────────────────────────────────────────────────────────────────────┐
│ RECEIVE, FROM THE FIRST COMPUTING DEVICE, AN INDICATION OF SELECTION OF AN UPGRADE SELECTION    │
│                    OPTION ASSOCIATED WITH THE FIRST USER INTERFACE                              │
│                                        608                                                      │
└─────────────────────────────────────────────────────────────────────────────┘
                                         ↓
┌─────────────────────────────────────────────────────────────────────────────┐
│ SEND, TO THE FIRST COMPUTING DEVICE, A REQUEST FOR DATA ASSOCIATED WITH A FULL USER ACCOUNT     │
│                               INITIALIZATION PROCESS                                            │
│                                        610                                                      │
└─────────────────────────────────────────────────────────────────────────────┘
                                         ↓
┌─────────────────────────────────────────────────────────────────────────────┐
│ BASED AT LEAST IN PART ON A RECEIPT OF THE DATA FROM THE FIRST COMPUTING DEVICE, GENERATE A     │
│ SECOND USER INTERFACE INCLUDING A SECOND FUNCTIONALITY, THE SECOND FUNCTIONALITY BEING GREATER  │
│ THAN THE FIRST FUNCTIONALITY, AND WHEREIN THE SECOND USER INTERFACE INCLUDES THE DIRECT         │
│                       MESSAGING INSTANCE OR THE COMMUNICATION CHANNEL                           │
│                                        612                                                      │
└─────────────────────────────────────────────────────────────────────────────┘
                                         ↓
┌─────────────────────────────────────────────────────────────────────────────┐
│              SEND, TO THE FIRST COMPUTING DEVICE, THE SECOND USER INTERFACE                     │
│                                        614                                                      │
└─────────────────────────────────────────────────────────────────────────────┘
```

LIMITED FUNCTIONALITY INTERFACE FOR COMMUNICATION PLATFORM

TECHNICAL FIELD

Communication platforms are becoming increasingly more popular for facilitating work-related communications, such as for project collaboration within a single organization and across two or more organizations. Many communication platforms require administrator approval for cross organization communications, to ensure appropriate people are collaborating on projects. However, the administrative approval process may be lengthy and may result in delays in communication. For example, an administrator for an organization may evaluate every request from a member of the organization to communicate with people from other organizations. The evaluation process may be time consuming and may delay communications between the member of the organization and the people from the other organizations. The delayed communications may result in lost work time on a project or the member seeking alternative, less secure means of communication, such as electronic mail or the like.

Additionally, members associated with a communication platform may desire to collaborate with others who are not associated with the communication platform. However, the onboarding process to some communication platforms may be onerous and time consuming. For initial contact with potential collaborators, the member and/or the potential collaborators may not be willing to invest the additional time in establishing long-term communication links via the communication platform. Thus, the members may again seek the alternative, lightweight means of communication during an initial contact.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6 illustrates an example process for modifying a user interface of a communication platform to include enhanced functionality, utilizing the techniques described herein.

DETAILED DESCRIPTION

Figure 1:
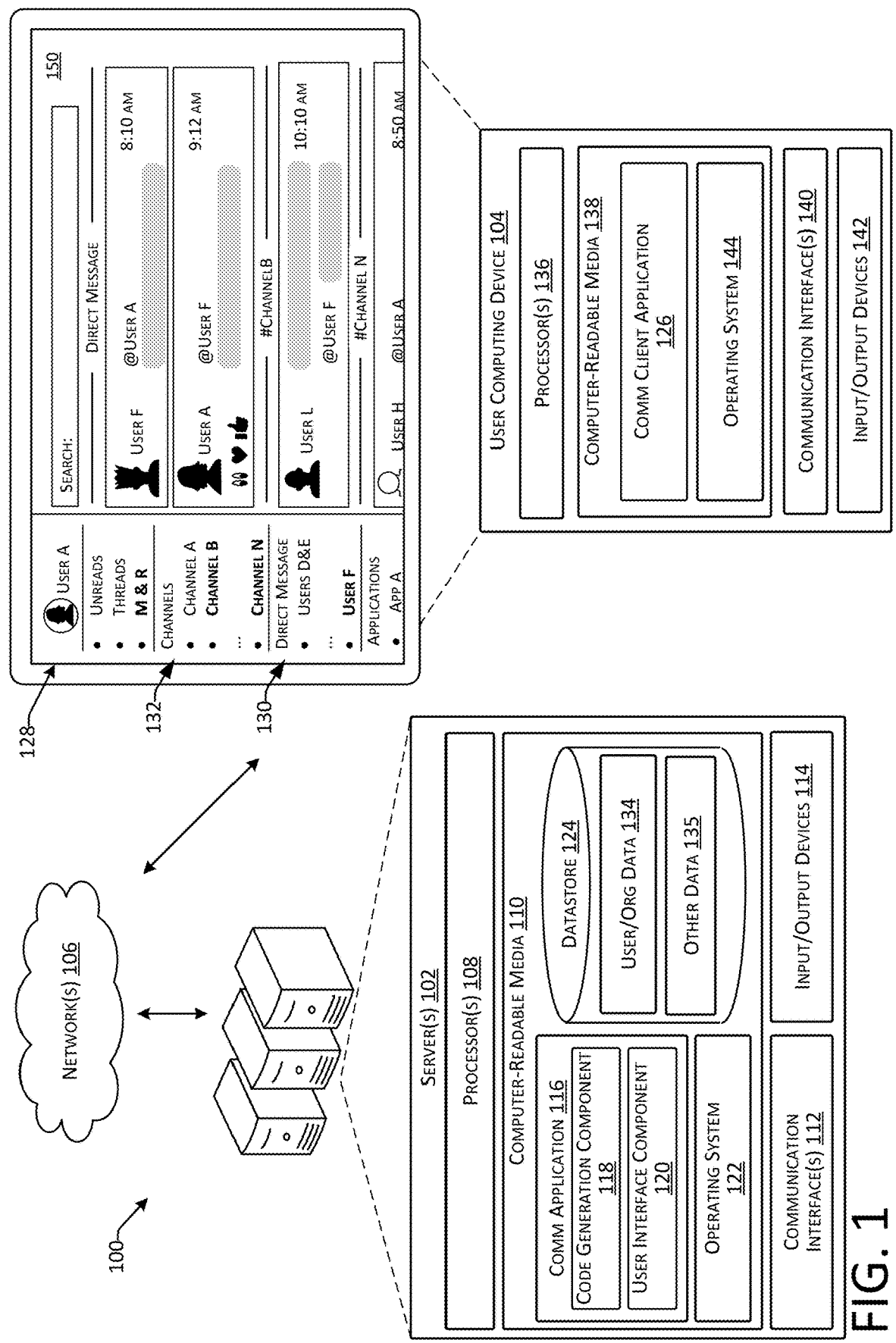
FIG. 1 illustrates a block diagram illustrating an example system of computing devices usable to implement example techniques described herein.

This application describes techniques for generating a limited functionality user interface to enable communications between two people associated with different organizations, to facilitate communication and collaboration, resulting in a decreased reliance on other means of communication and increasing communication security and/or privacy. For example, a first person may be associated with a communication platform and may submit a request to the communication platform to generate an invitation to communicate via the communication platform. The first person may provide the invitation to a second person directly (e.g., in person or via email) or via the communication platform. Responsive to receiving an indication that the second person has accepted the invitation, the communication platform may identify whether the second person is associated with the communication platform. Based on an identification that the second person is associated with the communication platform, the communication platform may modify a user interface associated with the second person to include a communication path (e.g., a communication channel, direct messaging instance, workspace, etc.) between the first person and the second person. Based on an identification that the second person is not associated with the communication platform, the communication platform may generate a limited functionality user interface, to enable communications between the first user and the second user. The communication platform may provide the limited functionality user interface to the second user, via which the first user and the second user may communicate via the communication platform.

The techniques described herein provide a technical solution to a technical problem of enabling secure communications between organizations. As discussed above, many people collaborate with individuals associated with other organizations, such as while working on a particular project. A first organization may use a communication platform to collaborate on the project. The communication platform may provide an efficient and secure means of communicating and storing information associated with the project. If the second organization does not use the communication platform, a member of the first organization may have to use alternate, less secure means of communication, such as electronic mail (email), text message, social networking messages, or the like. These alternate means of communication may not include enhanced security and/or privacy protocols, such as those associated with the communication application. As such, these less secure means of communication can threaten security of the information transmitted. To solve this technical problem related to information security, this application describes a means by which a member of the second organization may communicate with the member of the first organization via a limited functionality user interface of the communication platform.

This technical solution not only provides information security, but it also provides additional benefits, such as maintaining communications regarding a particular project, workspace or the like in a single place (e.g., stored in the communication platform), thereby rendering a search for a particular conversation, comment, feedback, document, or the like less time consuming Reducing a time associated with the search may improve the functioning of the associated computing device, as a search would require less processing power and fewer applications or programs accessed to find the particular conversation, comment, feedback, document, or the like.

The techniques described herein further improve performance of a user computing device by reducing a number of applications and/or programs running thereon for multiparty project collaboration. As discussed above, people collaborate with others to complete a project. The collaborators may be associated with two or more organizations. People collaborating on the project in a first organization may collaborate via a communication application managed by the communication platform. However, people in a different organization may not be associated with the communication platform, such as due to the onerous administrative approval and/or onboarding process associated with the communication platform. As such, to communicate about the project, the parties may use alternative means of communication, such as email, text message, social networking messages, or the like, at least at the inception of a collaborative effort. The alternative means of communication may require additional processing power and memory to continually update on the user computing device concurrently with the communication application. Due to the ease of establishing a limited functionality user interface enabling communications with a person not previously associated with the communication platform, the techniques described herein may improve the user computing device by reducing an amount of processing power and memory required to collaborate on the project.

Additionally, the techniques described herein improve performance of one or more computing devices by reducing an amount of content sent over a network. For instance, in a traditional communication platform system, to receive input from a non-vetted collaborator (e.g., not approved by an administrator) a user may send an email or request for the input via another method of communication. The user may then upload the information to the communication platform, such as to share with other members of a group collaborating on the project. Unlike the traditional methods, which require the data to be sent via a network at least twice, once via email and once via the communication platform, the techniques described herein provide a means by which a new collaborator may be easily connected with a person working on a project via a communication platform, such as to transfer data once over the communication platform. Thus, the techniques described herein may reduce the amount of content (e.g., email messages, etc.) sent over the network. As such, the quantity of data sent over the network may be reduced and the amount of bandwidth available may be increased.

Furthermore, the techniques described herein provide a better user experience for users associated with a communication platform. As discussed above, traditionally, the administrative approval and/or onboarding (e.g., joining, associating with the communication platform) processes may be lengthy and time consuming for those associated with the communication platform and, in some instances, for those onboarding to the communication platform. The techniques described herein provide an expedited means of enabling communications via the communication platform without the lengthy and time-consuming processes described above. As such, the techniques described herein may provide an enhanced user experience.

These and other aspects are described further below with reference to the accompanying drawings. The drawings are merely example implementations and should not be construed to limit the scope of the claims. For example, while some examples are illustrated in the context of a user interface for a mobile device, the same or similar techniques may be implemented using any computing device and the user interface may be adapted to the size, shape, and configuration of the particular computing device.

FIG. 1 illustrates an example environment 100 for performing techniques described herein. In at least one example, the example environment 100 may be associated with a communication platform that may leverage a network-based computing system to enable users of the communication platform to exchange data. In at least one example, the communication platform may be "group-based" such that the platform, and associated systems, communication channels, messages, and/or virtual spaces, have security (that can be defined by permissions) to limit access to a defined group of users. In some examples the communication platform is a channel-based messaging platform. In some examples, such groups of users may be defined by group identifiers, as described above, which may be associated with common access credentials, domains, or the like. In some examples, the communication platform may be a hub, offering a secure and private virtual space to enable users to chat, meet, call, collaborate, transfer files or other data, or otherwise communicate between or among each other. As described above, each group may be associated with a workspace, enabling users associated with the group to chat, meet, call, collaborate, transfer files or other data, or otherwise communicate between or among each other in a secure and private virtual space. In some examples, members of a group, and thus workspace, may be associated with a same organization. In some examples, members of a group, and thus workspace, may be associated with different organizations (e.g., entities with different organization identifiers).

In at least one example, the example environment 100 may include one or more server computing devices (or "server(s)") 102. In at least one example, the server(s) 102 may include one or more servers or other types of computing devices that may be embodied in any number of ways. For example, in the example of a server, the functional components and data may be implemented on a single server, a cluster of servers, a server farm or data center, a cloud-hosted computing service, a cloud-hosted storage service, and so forth, although other computer architectures may additionally or alternatively be used.

In at least one example, the server(s) 102 may communicate with a user computing device 104 via one or more network(s) 106. That is, the server(s) 102 and the user computing device 104 may transmit, receive, and/or store data (e.g., content, information, or the like) using the network(s) 106, as described herein. The user computing device 104 may be any suitable type of computing device, e.g., portable, semi-portable, semi-stationary, or stationary. Some examples of the user computing device 104 may include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 may include multiple (e.g., tens of, hundreds of, thousands of, millions of) user computing devices. In at least one example, user computing devices, such as the user computing device 104, may be operable by users to, among other things, access communication services via the communication platform. A user may be an individual, a group of individuals, an employer, an enterprise, an organization, or the like.

The network(s) 106 may include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications may depend at least in part upon the type of network, the environment selected, or both. Protocols for communicating over such network(s) 106 are well known and are not discussed herein in detail.

In at least one example, the server(s) 102 may include one or more processors 108, computer-readable media 110, one or more communication interfaces 112, and input/output devices 114.

In at least one example, each processor of the processor(s) 108 may be a single processing unit or multiple processing units, and may include single or multiple computing units or multiple processing cores. The processor(s) 108 may be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 may be one or more hardware processors and/or logic circuits of any suitable type specifically programmed or configured to execute the algorithms and processes described herein. The processor(s) 108 may be configured to fetch and execute computer-readable instructions stored in the computer-readable media, which may program the processor(s) to perform the functions described herein.

The computer-readable media 110 may include volatile and nonvolatile memory and/or removable and non-removable media implemented in any type of technology for storage of data, such as computer-readable instructions, data structures, program modules, or other data. Such computer-readable media 110 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that may be used to store the desired data and that may be accessed by a computing device. Depending on the configuration of the server(s) 102, the computer-readable media 110 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 110 may be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media may optionally include a communication application 116 (illustrated as comm application 116), a code generation component 118, a user interface component 120, an operating system 122, and a datastore 124.

The communication application 116 may enable interaction of content among user computing devices 104, such as via a communication client application 126. For example, content (e.g., messages including text, images, audio, video, etc.) can be shared among users associated with user accounts of an online communication network provided by the communication platform system and may include sharing content in accordance with a user account that is restricted, such as based on a type of account, organizational preferences, or the like. In at least one example, the communication application 116 may enable content sharing between a first user associated with a limited functionality user interface and a second user associated with an enhanced functionality user interface. The communication client application 126 may include a native application of the user computing device 104 and/or a web-based application. In some examples, the communication client application 126 enables interfaces to access content, to view content, and to generate content as those described with reference to FIGS. 4A-4C, for example. In particular examples, server(s) 102 may send instructions to present, transmit, and receive content as discussed with reference to FIGS. 4A-4C.

In various examples, the code generation component 118 may be configured to receive a request for an access code, such as from a first user associated with a first user computing device 104, and to generate the access code. The access code may include a token linking the access code to the first user and/or a first user profile associated therewith. In various examples, the access code may include an initial time stamp associated with generation of the code. In some examples, the access code may be valid (e.g., active) for a pre-determined period of validity (e.g., 3 days, 7 days, etc.). In such examples, the period of validity may start at the initial time stamp associated with generation of the code. In some examples, the period of validity may start at a second time stamp associated with delivering the access code to at least one of the first user computing devices 104 or a second user computing device 104.

In various examples, the code generation component 118 may be configured to send the access code to the first user computing device(s) 104. In such examples, the first user may distribute the access code and/or an associated invitation to communicate (via the communication platform) to the second user, such as in person, via email, text message, or the like. In some examples, the code generation component 118 may be configured to send the access code to the second user computing device(s) 104. In some examples, the code generation component 118 may send the access code and/or associated invitation to communicate to the second user computing device(s) 104 responsive to an instruction received from the first user. In some examples, the code generation component 118 may send the access code and/or associated invitation to communicate to the second user computing device(s) 104 based on receiving user data associated with the second user (e.g., an email address, telephone number, social networking handle, etc.).

In various examples, the code generation component 118 may be configured to revoke a previously generated invitation and/or access code. In some examples, the code generation component 118 may revoke the previously generated invitation and/or access code based on an expiration of a period of validity associated therewith. In some examples, the code generation component 118 may revoke the previously generated invitation and/or access code based on an instruction to revoke received from the first user via the first user computing device(s) 104.

In various examples, responsive to determining to revoke a previously generated invitation and/or access code (based on an expiration of a period of validity or an instruction from the first user), the code generation component 118 may modify and/or remove the token associating the first user with the invitation and/or the access code. In some examples, based on a determination to revoke the previously generated invitation and/or access code, code generation component 118 may associate an indication of invalidity with the invitation and/or the access code. In such examples, responsive to receiving an indication of an attempt to activate the access code, such as from the second user, the code generation component 118 may determine that the invitation and/or access code is no longer valid.

In various examples, the user interface component 120 may be configured to receive, from the second user computing device 104, a request to enable communications with the first user (e.g., user associated with an access code). The request may include an activation and/or selection of the access code. In some examples, responsive to receiving the request, the user interface component 120 may exchange process the token associated with the access code and identify the first user as being associated with the access code. In various examples, the user interface component 120 may verify that the access code is valid (e.g., time period associated with access code activation not expired, access code not revoked, etc.).

In various examples, the user interface component 120 may identify a second user associated with the request. In some examples, the second user may be identified based on a token associated with the invitation. In some examples, the first user may include user data associated with the second user in the request for the access code. In such examples, the code generation component 118 may include a token associating the second user with the access code. In some examples, the second user may be identified based on an Internet Protocol address associated with the request, a user device (e.g., identifier) associated with the request, or the like.

In at least one example, the user interface component 120 may send, to the second user computing device, a request for a name of the user and a user identifier associated with the second user. The user identifier may include an electronic mail (email) address, telephone number, and/or another identifier unique to the second user. In at least one example, the request may include a request for a name of the second user and an email address associated therewith. In various examples, the user interface component 120 may be configured to verify (e.g., authenticate) the user identifier, such as by sending an authenticating code to the user identifier. Responsive to receiving an input of the authenticating code from the second user computing device 104, the user interface component 120 may verify the user identifier.

In some examples, the user interface component 120 may determine, based on the user identifier, whether the second user is associated with the communication platform. In some examples, the user interface component 120 may determine the association based on a user account of the communication platform associated with the second user (e.g., user identifier associated with the user account). In some examples, the user interface component 120 may identify (e.g. determine) the association based on an instance of the communication client application 126 being stored on the second user computing device 104 associated with the second user.

In various examples, based on an identification (e.g., a determination) that the second user is associated with the communication platform, the user interface component 120 may modify a user interface 128 associated with the second user computing device 104 (and the communication client application 126). In the illustrative example, the user interface 128 includes an interface of enhanced functionality. In some examples, the enhanced functionality may include an ability to invite other users to join the communication platform (e.g., join a workspace, a communication channel, a direct messaging instance, etc., to create a communication channel, workspace and/or direct messaging instance, to name communication channels, workspaces, and/or direct messaging instances (e.g., to customize and/or name for viewing by two or more organizations), to view unread messages, thread, and mentions and reactions, to search for channels and/or workspaces, to search for files, people, groups, etc., to use third-party applications within the communication client application 126, to customize settings associated with the communication client application 126 and/or the user interface 128, and the like.

The user interface component 120 may modify the user interface 128 to include at least one of a direct messaging instance or a communication channel between the first user (who generated the invitation) and the second user (who accepted the invitation). A direct messaging instance may be included in a direct messaging instance menu 130 of the user interface 128 and/or the communication channel may be included in a communication channel menu 132 of the user interface 128. Each of the direct messaging instance menu 130 and the communication channel menu 132 may include one or more direct messaging instances and communication channels, respectively.

In various examples, based on an identification that the second user is not associated with the communication platform, the user interface component 120 may generate a limited functionality user interface (illustrated in FIG. 2B) to send to the second user computing device 104. The limited functionality user interface may include a functionality that is less than the enhanced functionality described above with regard to the user interface 128. In at least one example, the limited functionality user interface may include the functionality to communicate with the first user via the at least one of a direct messaging instance or a communication channel generated in response to the second user accepting the invitation to communicate. In such an example, the limited functionality user interface may include a means by which the second user may compose and/or read communications including content transmitted between the first user and the second user via the server(s) 102 (e.g., the communication application 116).

In some examples, a functionality of the limited functionality user interface may be limited to enabling communications via one or more direct messaging instances and/or the communication channels generated in response to an invitation. As such, the limited functionality user interface may not include one or more of the functionalities of the enhanced functionality user interface, such as the functionality to invite other users to join the communication platform, to create a communication channel, workspace and/or direct messaging instance, to name communication channels, workspaces, and/or direct messaging instances, to view unread messages, thread, and mentions and reactions, to search for channels and/or workspaces, to search for files, people, groups, etc., to associate and use third-party applications within the communication client application 126, and/or to customize settings associated with the communication client application 126 and/or the user interface 128, and/or other functionalities of a standard user account of the communication platform.

In at least one example, the limited functionality user interface may include a direct messaging instance menu 130 and/or a communication channel menu 132 with an indication the at least one of the direct messaging instance or the communication channel In some examples, the limited functionality user interface may include one or more direct messaging instances and/or one or more communication channels with which the second user is associated. In such examples, the direct messaging instance(s) and/or the communication channel(s) may include those generated responsive to the second user receiving invitations to communicate with other users (e.g., the first user, a third user, a fourth user, etc.). In such examples, the limited functionality user interface may enable communications between the second user and the other users via respective direct messaging instances and/or communication channels, based on invitations to communicate therethrough.

In some examples, the limited functionality user interface may be usable by the second user in perpetuity. In such examples, the second user may send, receive, and/or access data associated with the direct messaging instances and/or communication channels to which the second user was invited via invitation for an unlimited time period. In some examples, the limited functionality user interface may be usable by the second user to communicate with one or more other users until the second user deletes the account (e.g., dissociates with the communication platform) and/or the other users delete the direct messaging instances and/or communication channels associated with invitations.

In some examples, the limited functionality user interface may include an option to upgrade the user account of the second user, such as to an enhanced user interface with additional functionality. The user interface component 120 may receive an indication of selection of the option to upgrade and may initiate a full user account initialization process. The full user account initialization process may include the user interface component 120 requesting data associated with the second user and/or an organization associated therewith. The organizational data may include user data associated with one or more other users of the organization (e.g., names, user identifiers, addresses, demographic data, etc.), an administrator identifier (e.g., name, account data, etc.), organizational preferences (e.g., security settings, restrictions on expedited communications (e.g., invitation codes authorized, invitation codes not authorized, associated users permitted to generate codes, etc.)), payment information, and other information used by the server(s) 102 to generate a new organizational account.

In various examples, the limited functionality user interface may include a time period of activation. In some examples, the time period may include a pre-determined time period (e.g., 14 days, 30 days, etc.). In various examples, the pre-determined time period may be determined based on a user account associated with the first user and/or the second user. In such examples, the user interface component 120 may access a user and/or organization profile (stored in the user/organizational data 134) associated with the first user and/or the second user to determine the pre-determined time period. For example, the first user account may permit direct messaging instances initiated via invitation to be active for 15 days. In some examples, the pre-determined time period may be determined based on organizational preferences corresponding to a first organization associated with the first user and/or a second organization associated with the second user. In such examples, the user interface component 120 may access user and/or organizational data 134 associated with the first organization and/or the second organization to determine the pre-determined time period.

In some examples, the user interface component 120 may determine a time stamp associated with a generation of the limited functionality user interface (e.g., a time associated with creation of the at least one of the direct messaging instance or the communication channel between the first user or the second user). The user interface component 120 may determine a second time associated with deactivation of the limited functionality user interface. The second time may include a time associated with an elapse of the pre-determined time period after generation and/or delivery of the limited functionality user interface (e.g., time stamp associated with the generation, delivery, etc.).

Based on a determination that a current time is associated with the second time, the user interface component 120 may deactivate the limited functionality user interface. In various examples, the user interface component 120 may disable one or more features of the limited functionality user interface. In some examples, the disabled feature(s) may include features associated with drafting messages, sending the messages, and/or sending files and/or other attachments via the at least one of the direct messaging instance or the communication channel.

In various examples, the time period of activation of the limited functionality user interface may correspond to a particular project in which the first user and the second user are associated. In some examples, the first user may provide an indication to the code generation component 118 that a particular access code is associated with a particular project. In some examples, the code generation component 118 may associate information about the particular project to the access code.

In some examples, upon activation of the access code by the second user, the user interface component 120 may determine the association of the limited functionality user interface and/or the at least one of the direct messaging instance or the communication channel corresponding thereto with the particular project based on the access code. In various examples, the user interface component 120 may access stored data associated with the particular project, such as to determine an end time associated therewith. In such examples, the user interface component 120 may determine a time in which to disable the limited functionality user interface based on the end time associated with the particular project.

In some examples, the communication application 116 may process messages via the at least one of the direct messaging instance or the communication channel until a current time is associated with an end time of the particular project. In some examples, the communication application 116 may process messages via the at least one of the direct messaging instance or the communication channel until receiving an indication from the first user computing device 104 or the second user computing device 104 that the particular project is complete. In some examples, the indication may include an instruction to disable the limited functionality user interface and/or the at least one of the direct messaging instance or the communication channel associated with the invitation.

In various examples, based on receiving the organizational data and/or additional data requested by the communication application 116, the communication application 116 may generate the new organizational account associated with an organization of the second user. The organizational data and/or user data associated with users of the new organizational account may be stored in the user/organizational data 134 of the datastore 124. In some examples, based on receiving an indication that the new organizational account has been established, the user interface component 120 may modify the limited functionality user interface to an enhanced functionality user interface, such as user interface 128 illustrated in FIG. 1. In some examples, data associated with the user interface 128 may be stored in the user/organizational data 134 associated with the datastore 124.

In at least one example, the datastore 124 may be configured to store data that is accessible, manageable, and updatable. In some examples, the datastore 124 may be integrated with the server(s) 102, as shown in FIG. 1. In other examples, the datastore 124 may be located remotely from the server(s) 102 and may be accessible to the server(s) 102 and/or user device(s), such as the user computing device 104. The datastore 124 may comprise multiple databases, which may include user/organizational data 134, as discussed above, and other data 135. Additional or alternative data may be stored in the data store and/or one or more other data stores.

In at least one example, the user/organizational data 134 may store data associated with users of the communication platform. In at least one example, the user/organizational data 134 may store data in user profiles (which may also be referred to as "user accounts"), which may store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the user/organizational data 134 may store data in organizational profiles (which can also be referred to as "organization accounts"), which may store data associated with an organization, including, but not limited to, one or more organization identifiers, one or more communication channel identifiers associated with the organization, one or more group identifiers for groups (or, organizations, teams, entities, or the like) associated with the organization, an administrator identifier, organizational preferences, content transmitted via the communication platform in association with the organization (e.g., messages, emojis, conversations, documents, etc.), user identifiers associated with the organization, and the like.

In various examples, the other data 135 may include channel data associated with individual communication channels. The communication channels may allow the user computing devices to communicate and share data between and among each other. In at least one example, each communication channel may be assigned a communication channel identifier, which indicates the physical address in the channel data where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators, etc.). In some examples, a communication channel may be "shared," which may allow users associated with different organizations (e.g., entities associated with different organization identifiers) to join and participate in the data sharing through the communication channel Shared channels may be public such that they are accessible to any user of either organization, or they may be private such that they are restricted to access by certain users or users having particular roles from both organizations.

In various examples, the other data 135 may include direct messaging instance data associated with direct messaging instances. The direct messaging instances may allow the user computing devices to communicate and share data between and among each other, such as in private conversations. A direct messaging instance may include two or more users. In at least one example, each direct messaging instance may be assigned a direct messaging instance identifier, which indicates the physical address in the channel data where data related to that communication channel is stored. In some examples, each direct messaging instance may include user identifiers associated with users associated therewith.

In some examples, the datastore 124 may be partitioned into discrete items of data that may be accessed and managed individually (e.g., data shards). Data shards may simplify many technical tasks, such as data retention, unfurling (e.g., detecting that message contents include a link, crawling the link's metadata, and determining a uniform summary of the metadata), and integration settings. In some examples, data shards may be associated with organizations, groups (e.g., workspaces), communication channels, users, or the like.

In some examples, individual organizations may be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard may store data related to two or more organizations (e.g., as in a shared channel).

In some examples, individual groups may be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a communication channel may be associated with a database shard within the datastore 124 that stores data related to a particular channel identification.

For example, a database shard may store electronic communication data associated with the communication channel, which enables members of that particular communication channel to communicate and exchange data with other members of the same communication channel in real time or near-real time. In this example, a group or organization may be the owner of the database shard and may control where and how the related data is stored.

In some examples, individual users may be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 may include one or more interfaces and hardware components for enabling communication with various other devices (e.g., the user computing device 104), such as over the network(s) 106 or directly. In some examples, the communication interface(s) 112 may facilitate communication via Websockets, Application Programming Interfaces (APIs) (e.g., using API calls), HyperText Transfer Protocols (HTTPs), etc.

The server(s) 102 may further be equipped with various input/output devices 114 (e.g., I/O devices). Such I/O devices 114 may include a display, various user interface controls (e.g., buttons, joystick, keyboard, mouse, touch screen, etc.), audio speakers, connection ports and so forth.

In at least one example, the user computing device 104 may include one or more processors 136, computer-readable media 138, one or more communication interfaces 140, and input/output devices 142.

In at least one example, each processor of the processor(s) 136 may be a single processing unit or multiple processing units, and may include single or multiple computing units or multiple processing cores. The processor(s) 136 may comprise any of the types of processors described above with reference to the processor(s) 108 and may be the same as or different than the processor(s) 108.

The computer-readable media 138 may comprise any of the types of computer-readable media 138 described above with reference to the computer-readable media 110 and may be the same as or different than the computer-readable media 110. Functional components stored in the computer-readable media may optionally include at least one communication client application 126 described above and an operating system 144.

In at least one example, the communication client application 126 may be a mobile application, a web application, or a desktop application, which may be provided by the communication platform or which may be an otherwise dedicated application. In some examples, individual user computing devices associated with the environment 100 may have an instance or versioned instance of the communication client application 126, which can be downloaded from an application store, accessible via the Internet, or otherwise executable by the processor(s) 136 to perform operations as described herein. That is, the communication client application 126 may be an access point, enabling the user computing device 104 to interact with the server(s) 102 to access and/or use communication services available via the communication platform. In at least one example, the communication client application 126 may facilitate the exchange of data between and among various other user computing devices, for example via the server(s) 102. In at least one example, the communication client application 126 may present user interfaces, as described herein. In at least one example, a user may interact with the user interfaces via touch input, keyboard input, mouse input, spoken input, or any other type of input, enabled by the I/O devices 142. Additional details associated with the user interfaces will be discussed with regard to FIGS. 2A and 2B.

In at least one example, the operating system 144 may manage the processor(s) 136, computer-readable media 138, hardware, software, etc. of the user computing device 104.

The communication interface(s) 140 may include one or more interfaces and hardware components for enabling communication with various other devices (e.g., the user computing device 104), such as over the network(s) 106 or directly. In some examples, the communication interface(s) 140 may facilitate communication via Websockets, APIs (e.g., using API calls), HTTPs, etc.

The user computing device 104 may further be equipped with various input/output devices 142 (e.g., I/O devices). Such I/O devices 142 may include a display, various user interface controls (e.g., buttons, joystick, keyboard, mouse, touch screen, etc.), audio speakers, connection ports and so forth.

While techniques described herein are described as being performed by the communication application 116, the code generation component 118, the user interface component 120, and the communication client application 126, techniques described herein may be performed by any other component, or combination of components, which may be associated with the server(s) 102, the user computing device 104, or a combination thereof.

Figure 2A:
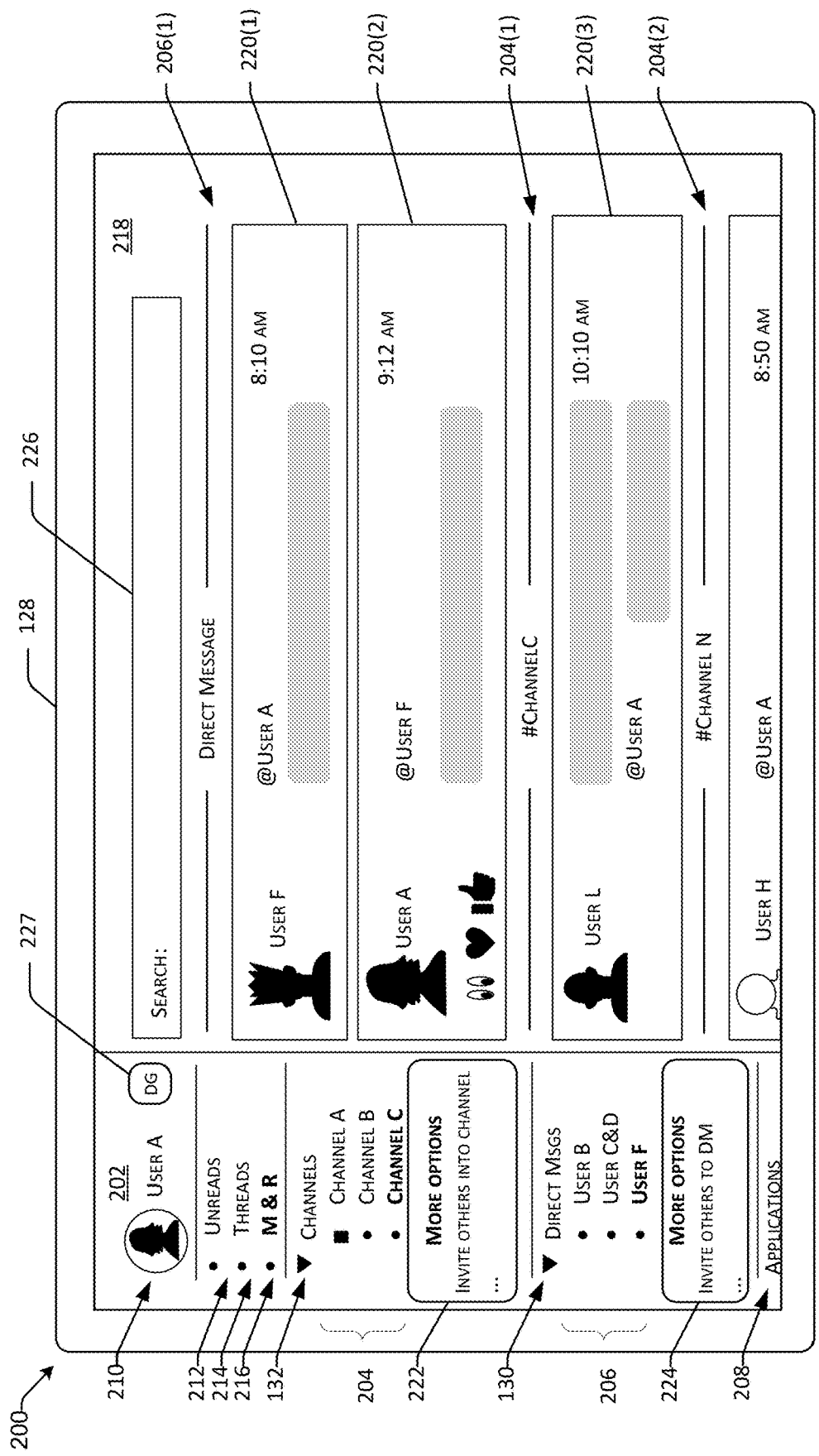
FIG. 2A is a schematic view of an example full functionality user interface associated with a communication platform.

FIG. 2A illustrates additional details associated with the user interface 128 that includes an enhanced functionality, as described above with reference to FIG. 1. The user interface 128 may be associated with a user computing device 200, such as user computing device 104. may present data associated with multiple communication channels, direct messaging instances, and the like, as described above with reference to FIG. 1.

As illustrated in FIG. 2A, the user interface 128 may include a first region 202, or pane, that includes indicator(s) (e.g., user interface element(s) or object(s)) of one or more communication channels 204, one or more direct messaging instances 206, and/or one or more applications 208 with which a user 210 (e.g., account of the user) is associated. Additionally, in some examples, the first region 202 may include indicator(s) of one or more workspaces with which the user 210 (e.g., User A) is associated.

In various examples, the first region 202 of the user interface 128 may be separated into sub-sections, or sub-panes, associated with each of the communication channel(s) 204, the direct messaging instance(s) 206, and/or the application(s) 208. In some examples, the first region 202 may additionally include a sub-section including various functionalities of the enhanced functionality user interface 128, such as a sub-section including indicators associated with "unread" messages, "threads" and "mentions and reactions," which will be described in further detail below.

In at least one example, the first region 202 may include a subsection that includes a menu of communication channels 132 including indicators the communication channel(s) 204. In some examples, the communication channel(s) 204 may include public channels, private channels, shared channels (e.g., between groups or organizations), single workspace channels, cross-workspace channels, combinations of the foregoing, or the like. In some examples, the communication channels represented may be associated with a single workspace. In some examples, the communication channels represented may be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented may be associated with combinations of communication channels associated with a single workspace and communication channels associated with different workspaces.

In some examples, the sub-section associated with the communication channel(s) 204 may depict all communication channels 204, or a subset of all communication channels 204, that the user has permission to access (e.g., as determined by user/organizational data 134). In such examples, the communication channel(s) 204 may be arranged alphabetically, based on most recent interaction, based on frequency of interactions, based on communication channel type (e.g., public, private, shared, cross-workspace, etc.), based on workspace, in user-designated sections, or the like. In some examples, the sub-section associated with the communication channel(s) 204 may depict all communication channels, or a subset of all communication channels, that the user 210 is a member of, and the user may interact with the user interface 128 to browse or view other communication channels that the user is not a member of but are not currently displayed in the sub-section. In some examples, different types of communication channels (e.g., public, private, shared, cross-workspace, etc.) may be in different sections of the sub-section associated with the communication channel(s) 204, or may have their own sub-regions or sub-panes in the user interface 128. In some examples, communication channels associated with different workspaces may be in different sections of the sub-section associated with the communication channel(s) 204, or may have their own regions or panes in the user interface 128.

In some examples, the indicators may be associated with graphical elements that visually differentiate types of communication channels. For example, Channel B is associated with a square visual element instead of a circle visual element. As a non-limiting example, and for the purpose of this discussion, the square visual element may indicate that the user is not a current member of Channel B, whereas the circle visual element may indicate that the user is a current member of Channels A, C, and N. In some examples, additional or alternative graphical elements may be used to differentiate between public communication channels, private communication channels, shared communication channels (e.g., communication channels shared between two or more organizations), communication channels associated with different workspaces, and the like. In other examples, communication channels that the user is not a current member of may not be displayed in the sub-section associated with the communication channel(s) 204 of the user interface 128. In such examples, the user may navigate to a different interface (not shown) to browse additional channels that are accessible to the user but to which the user is not currently a member.

In addition to the sub-section associated with the communication channel(s) 204, the first region 202 may include a sub-section associated with the direct messaging instance(s) 206, or sub-pane. The sub-section associated with the direct messaging instance(s) 206 may include indicators representative of communications with individual users or multiple specified users (e.g., instead of all, or a subset of, members of an organization). Such communications may be referred to as "direct messages." That is, the sub-section associated with the direct messaging instance(s) 206, or sub-pane, may include indicators representative of virtual spaces that are associated with private messages between one or more users sent via the one or more direct messaging instances 206.

In the illustrative example, the first region 202 may additionally include a sub-section associated with one or more applications 208 the user 210 may access via the user interface 128. In some examples, the enhanced functionality associated with the user interface 128 may include a functionality to access and/or use third-party applications 208 via the user interface 128. In various examples, the third-party application(s) 208 may include application(s) provided by one or more third-party service providers that are configured to perform one or more services (e.g., payment processing services, calendar services, video conferencing services, social networking services, etc.). In various examples, the functionality to access and/or use the third-party applications 208 may enhance a user 210 experience and increase collaboration across multiple platforms.

In various examples, the enhanced functionality of the user interface 128 may include functionality associated with filtering communications associated with the communication channel(s) 204, direct messaging instance(s) 206 and/or workspaces, such as to view unread communications, communications associated with threads, and/or communications including a mention of or reaction to a user 210. For example, as illustrated, a first region 202, or pane, includes an unread selectable control 212, a thread selectable control 214, and a mention and reaction (e.g., M&R) selectable control 216.

In various examples, the unread selectable control 212 may include a selectable control that, when selected, activates a virtual space associated with unread data corresponding to a user account or portion thereof (e.g., a workspace). The unread data may be associated with one or more of the communication channel(s) 204 and/or one or more of the direct messaging instance(s) 206 with which the user 210 is associated. That is, in some examples, if a user 210 requests to access the virtual space associated with "unreads," data that has not been read ("viewed") by the user 210 may be presented in a second region 218, or pane, of the user interface 128, for example in a feed. In such examples, different types of events and/or actions, which may be associated with different communication channels and/or virtual spaces, may be presented via a same feed. In some examples, such data may be organized and/or is sortable by workspace, time, type of action, communication channel, user, or the like. In some examples, such data may be associated with an indication of which user (e.g., member of the communication channel) posted the message and/or performed an action In various examples, the thread selectable control 214 may include a selectable control that, when selected, activates a virtual space associated with one or more threads corresponding to a user account or portion thereof. The thread(s) presented via the virtual space may be associated a same type of event and/or action. For example, "threads" may be associated with messages, files, etc. posted in threads to messages posted in a communication channel In various examples, if a user 210 requests to access the virtual space associated with thread data, the communication platform may cause the one or more threads associated with one or more communication channels 204 to be presented in the second region 218, for example in a feed. In various examples, the virtual space associated with threads may be organized and/or is sortable by workspace, time, type of action, communication channel, user, or the like.

In various examples, the M&R selectable control 216 may include a selectable control that, when selected, activates a virtual space associated with one or more messages posted in a communication channel or a direct messaging instance in which the user 210 has been mentioned (e.g., via a tag) or another user has reacted (e.g., via an emoji, reaction, or the like) to a message or thread posted by the user 210. In various examples, the virtual space associated with mentions and reactions may be organized and/or is sortable by workspace, time, type of action, communication channel, user, or the like.

In various examples, the mentions and reactions, similar to the threads, may be associated with a same type of event and/or action. In various examples, data associated with same types of events and/or actions (e.g., a thread associated with a communication channel, mentions associated with a direct messaging instance, etc.), which may be associated with different communication channels and/or virtual spaces, may be presented in the second region 218 via a same feed.

In various examples, the user 210 may navigate between the unread messages, threads, mention and reaction messages, workspaces, communication channels 204, direct messaging instances 206, and/or applications 208, by actuating a control associated with individual indicators associated therewith. Non-limiting examples of such indicators, or any indictors described herein, may include icons, symbols, links, tabs, or other user interface elements or objects. In some examples, such indicators may be associated with actuation mechanisms to enable a user to select an indicator and transition to a different virtual space. In some examples, a visual indicator may indicate which selectable control (e.g., unread selectable control 212, thread selectable control 214, or M&R selectable control 216), workspace, communication channel 204, direct messaging instance 206, and/or application 208 a user is currently interacting with and/or most recently interacted with. For example, the M&R selectable control 216 is outlined in a heavier weight than the unread selectable control 212 and the thread selectable control 214, thereby indicating which selectable control the user 210 is currently interacting with and/or most recently interacted with.

In some examples, communication channels 204 and/or direct messaging instances 206 corresponding to the selectable control may additionally include the visual indicator. For example, the M&R selectable control 216 is selected by the user, causing a first messages 220(1) and a second message 220(2) associated with a direct messaging instance with User F (e.g., direct messaging instance 206(1)), a third message 220(3) associated with communication channel C (e.g., first communication channel 204(1)) and a fourth message 220(4) associated with a communication channel N (e.g., second communication channel 204(2)) to be presented via the second region 218. As such, the visual indicators associated with the direct messaging instance with User F, the communication channel C and the communication channel N are outlined in a heavier weight than other communication channels 204 and direct messaging instances 206.

In various examples, the enhanced functionality of the user interface 128 may include an association with a plurality of communication channels 204, a plurality of direct messaging instances 206, and, in some examples, one or more workspaces (not illustrated). In various examples, the plurality of communication channels 204, the plurality of direct messaging instances 206, and the workspace(s) may be associated with an organization of the user 210. In some examples, at least one of the communication channels 204 may include shared communication channels between the user 210 and a user of a different organization. In some examples, the direct messaging instances and/or workspaces may include one or more users associated with an organization that is different from the organization of the user 210.

As described above, the enhanced functionality of the user interface 128 may include the functionalities associated with one or more communication channels 204. In some examples, the functionalities associated with the communication channel(s) 204 may be enabled via a channel options selectable control 222. In some examples, responsive to receiving an indication of selection of the channel options selectable control 222, the user 210 may perform the functionalities associated with the communication channel(s) 204. In the illustrative example, a functionality of the enhanced functionality may include an option to invite other users to join a communication channel 204. In some examples, the functionality of the enhanced functionality may include creating a new communication channel 204, deleting or otherwise editing a communication channel 204 (e.g., re-naming, modifying users associated therewith, etc.).

Additionally or alternatively, the enhanced functionality of the user interface 128 may include functionalities associated with one or more direct messaging instances 206. In some examples, the functionalities associated with the direct messaging instance(s) 206 be enabled via a DM options selectable control 224. In some examples, responsive to receiving an indication of selection of the DM options selectable control 224, the user 210 may perform the functionalities associated with the direct messaging instance(s) 206. In the illustrative example, a functionality of the enhanced functionality may include an option to invite other users to communicate via a direct messaging instance (e.g., invite others to DM). In some examples, the functionality of the enhanced functionality may include creating a new direct messaging instance, deleting or otherwise editing an existing direct messaging instance (e.g., inviting another user to join an existing direct messaging instance), naming a direct messaging instance, and the like.

In various examples, the enhanced functionality associated with the user interface 128 may include a searching and/or browsing functionality enabled via search input box 226. In various examples, the search input box 226 may enable the user 210 to search for channels and/or workspaces associated with an organization of the user 210. In some examples, the search input box 226 may enable the user 210 to search for to search for people, groups, and the like associated with the organization and/or the communication platform. In some examples, the search input box 226 may enable the user 210 to search through one or more communication channels 204 and/or direct messaging instances 206 with which the user 210 is associated, such as for files, conversations, particular messages, and the like. For example, the user 210 may search through a direct messaging instance 206(1) for a document sent by the User F.

As described above, in at least one example, the user interface 128 may include a second region 218, or pane, that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the second region 218 may be associated with the same or different workspaces. That is, in some examples, the third region 150 may present data associated with the same or different workspaces via an integrated feed. In some examples, the data may be organized and/or is sortable by workspace, time, type of action, communication channel 204, user, or the like. In some examples, such data may be associated with an indication of which user posted the message and/or performed an action. In examples where the second region 218 presents data associated with multiple workspaces, at least some data may be associated with an indication of which workspace the data is associated with.

For purposes of this discussion, a "message" may refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform may include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user may comment on a message in a "thread." A thread may be a message associated with another message that is not posted to a communication channel, but instead is maintained within an object associated with the original message. Messages and/or threads may be associated with file(s), emoji(s), app(s), etc.

A communication channel or other virtual space may be associated with data and/or content other than messages, or data and/or content that is associated with messages. For example, non-limiting examples of additional data that may be presented via the second region 218 of the user interface 128 include members added to and/or removed from the communication channel, file(s) (e.g., file attachment(s)) uploaded and/or removed from the communication channel, application(s) added to and/or removed from the communication channel, post(s) (data that may be edited collaboratively, in near real-time by one or members of a communication channel) added to and/or removed from the communication channel, description added to, modified, and/or removed from the communication channel, modifications of properties of the communication channel, etc.

In some examples, the second region 218 may comprise a feed associated with a single communication channel 204, such as the first communication channel 204(1). In such examples, data associated with the communication channel 204(1) may be presented via the feed. In at least one example, data associated with a communication channel 204(1) may be viewable to at least some of the users of a group of users associated with a same group identifier. In some examples, for members of a communication channel 204(1), the content of the communication channel 204(1) (e.g., messaging communications) may be displayed to each member of the communication channel 204(1). For instance, a common set of group-based messaging communications may be displayed to each member of the communication channel such that the content of the communication channel 204(1) (e.g., messaging communications) may not vary per member of the communication channel 204(1). In some examples, data associated with a communication channel may appear differently for different users (e.g., based on personal configurations, group membership, etc.).

In at least one example, the format of the individual communication channels or virtual spaces may appear differently to different users. In some examples, the format of the individual communication channels or virtual spaces may appear differently based on which workspace a user is currently interacting with or most recently interacted with. In some examples, the format of the individual communication channels or virtual spaces may appear differently for different users (e.g., based on personal configurations, group membership, etc.).

The user interface 128 is a non-limiting example of a user interface including enhanced functionality that may be presented via the user computing device 104 (e.g., by the communication application 116 and/or the communication client application 126). In some examples, the communication application 116 may receive data from the code generation component 118 and/or user interface component 120 and the communication application 116 may generate and present the user interface 128 based on the data. In other examples, the communication client application 126 may receive data and instructions for generating the user interface 128 from the user interface component 120. In such an example, the communication client application 126 may present the user interface 128 based on the instructions. Additional or alternative data may be presented via a user interface and additional or alternative configurations are be imagined.

In various examples, the user interface 128 may include a downgrade selectable control 227. In various examples, the downgrade selectable control 227 may enable the user 210 to downgrade from an account from a standard account associated with the communication platform (e.g., account associated with an organization, account associated with a subscription (e.g., paid or unpaid), and the like. In various examples, responsive to receiving an indication of selection of the downgrade selectable control 227 and/or a confirmation thereof, the communication platform may dissociate the user 210 from an organization associated therewith, such as to modify the user account to a single user account (e.g., not associated with an organization and/or other users). In various examples, the downgrade of the account may downgrade the functionality of the user interface associated therewith from the enhanced functionality associated with the user interface 128 to a limited functionality user interface.

Figure 2B:
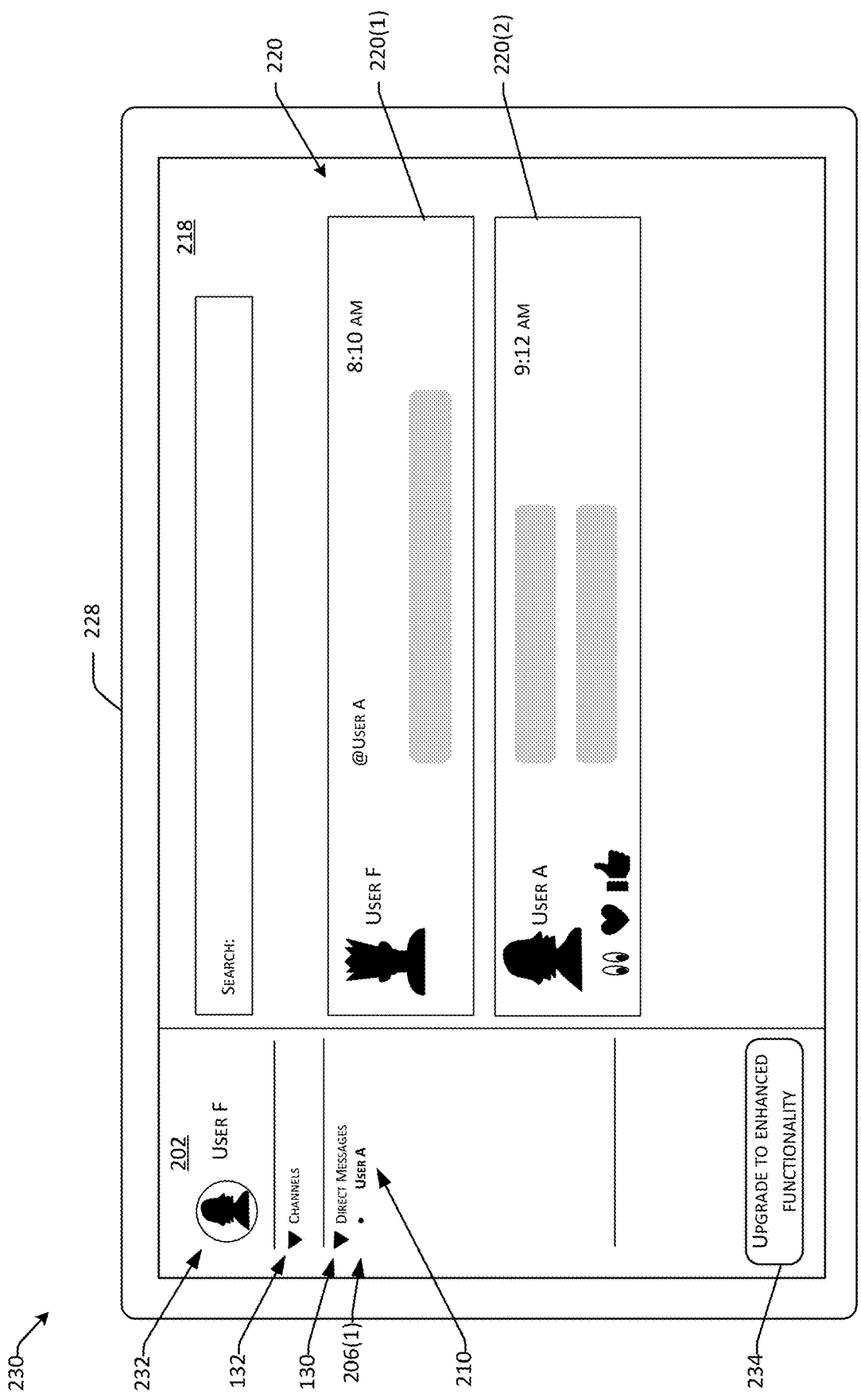
FIG. 2B is a schematic view of an example limited functionality user interface associated with a communication platform.

FIG. 2B illustrates an example user interface 228 of a communication platform that includes a limited functionality, as described above with reference to FIG. 1. The user interface 228 may be presented via a user computing device 230, such as user computing device 104 and/or user computing device 200.

In various examples, the communication platform (e.g., user interface component 120 of a communication application 116) may generate the user interface 228 in response to receiving, from the user computing device 230, an acceptance of an invitation to communicate via the communication application and determining that a user 232 associated with the user computing device 230 is not associated with the communication platform.

As discussed above, the communication platform may receive, from the user computing device 230, an indication of selection of an invitation to communicate via the communication platform. In some examples, the indication of selection of the invitation may include an indication that an access code associated with the invitation has been accessed by the user 232 via the user computing device 230. In various examples, responsive to receiving the indication of selection of the invitation, the communication platform may request data from the user 232. In at least one example, the data may include a name and/or a user identifier (e.g., email address, telephone number, or another unique identifier usable to identify a user) associated with the user 232.

In various examples, the communication platform may compare the name and/or the user identifier with one or more names and/or user identifiers stored in a database, such as that stored in user/organizational data 134 of datastore 124 to determine whether the name and/or user identifier is associated with a user account of the communication platform. Based on a determination that the name and/or user identifier is not associated with the user account, the communication platform may generate the user interface 228 with limited functionality, to enable the user 232 to communicate with the other user (e.g., user who invited the user 232 to communicate) via the communication platform.

The limited functionality of the user interface 228 may include a functionality that is less than the enhanced functionality described above with regard to the user interface 128. In at least one example, the limited functionality of the user interface 228 may include the functionality to communicate with the first user via the at least one of a direct messaging instance or a communication channel generated in response to the user 232 accepting the invitation to communicate. In such an example, the limited functionality of the user interface 228 may include a means by which the second user may compose and/or read communications including content transmitted between the first user and the second user via the server(s) 102 (e.g., the communication application 116).

In the illustrative example, the user interface 228 may include a first region 202, or pane, that includes indicator(s) (e.g., user interface element(s) or object(s)) associated with a communication channel menu 132 and a direct messaging instance menu 130. In various examples, the communication channel menu 132 may include one or more communication channels, such as communication channel(s) 204. In such examples, the communication channel(s) may be limited to communication channels in which the user 232 has been invited to join (and accepted the invitation). In the illustrative example, the direct messaging instance menu 130 includes a single direct messaging instance 206(1) (e.g., with User A). In such an example, the functionality of the user interface 228 may be limited to enabling communications between the user 232 (e.g., User F) and the user 210 (e.g., User A). In other examples, the limited functionality of the user interface 228 may be limited to enabling communications via two or more direct messaging instances to which the user 232 is invited to communicate.

As illustrated, the user interface 228 may include a second region 218, or pane, via which one or more messages 220 associated with the direct messaging instance 206(1) may be viewable. In various examples, the second region 218 may provide the functionality of viewing messages 220, reacting to messages 220, generating and sending messages 220 via the direct messaging instance 206(1). As discussed above, the second region 218 may present the messages 220 in a feed, such as in chronological order.

In various examples, the user interface 228 may include a search input box 226, however, the searching functionality associated with the user interface 228 may be less than the search functionality described above with regard to the enhanced functionality of user interface 128. For example, the search functionality of the user interface 228 may be limited to searching content associated with the direct messaging instance 206(1) or other communication channel and/or direct messaging instance to which the user 232 is invited.

In various examples, the limited functionality of the user interface 228 may not include one or more other functionalities described above with regard to the enhanced functionality of the user interface 128, such as the functionality to invite other users to join the communication platform, to create a communication channel, workspace and/or direct messaging instance, to name communication channels, workspaces, and/or direct messaging instances, to view unread messages, thread, and mentions and reactions, to search for channels and/or workspaces, to search for files, people, groups, etc., to associate and use third-party applications within the user interface 228, and/or to customize settings associated with the user interface 228, and/or other functionalities of a standard user account of the communication platform.

In some examples, the user interface 228 may be usable by the user 232 in perpetuity. In such examples, the user 232 may send, receive, and access data associated with the direct messaging instance 206(1) (and/or other direct messaging instances and/or communication channels to which the second user was invited via invitation) for an unlimited time period. In some examples, the user interface 228 may be usable by the user 232 to communicate with one or more other users (e.g., user 210) until the user 232 deletes the account (e.g., dissociates with the communication platform) and/or the other users delete the direct messaging instances and/or communication channels associated with invitations. For example, responsive to the user 210 deleting the first direct messaging instance 206(1), the user 232 may no longer have access to the data associated therewith and/or the user interface 228.

In various examples, the user interface 228 may be usable by the user 232 for a limited time period. In some examples, the time period may include a pre-determined time period (e.g., 14 days, 30 days, 1 year, etc.). In some examples, the time period may start at a time associated with generation of the user interface 228 and/or a communication channel and/or direct messaging instance, such as direct messaging instance 206(1) associated therewith. In some examples, at the expiration of the time period, the communication platform may deny the user 232 access to the user interface 228. In some examples, the communication platform may disable one or more functionalities of the user interface 228, such as the ability of the user 232 to interact with content (e.g., react to messages, search messages, etc.), draft new messages, and the like.

In some examples, at the expiration of the time period, the communication platform may invite the user 232 to upgrade the user account associated with limited functionality to an account associated with full or enhanced functionality. In some examples, the invitation to upgrade the user account may include an upgrade selectable control 234 configured to enable the user 232 to upgrade a user account associated therewith, such as to the user interface 128 of enhanced functionality. In various examples, responsive to receiving an indication of selection of the upgrade selectable control 234, the communication platform may initiate a full user account initialization process. The full user account initialization process may include the user interface component 120 requesting data associated with the user 232 and/or an organization associated therewith. Data associated with the organization (e.g., organizational data) may include user data associated with one or more other users of the organization (e g, names, user identifiers, addresses, demographic data, etc.), an administrator identifier (e.g., name, account data, etc.), organizational preferences (e.g., security settings, restrictions on expedited communications (e.g., invitation codes authorized, invitation codes not authorized, associated users permitted to generate codes, etc.)), payment information, and other information used by the communication platform to generate a new organizational account.

Additionally or alternatively, the user interface 228 may include the upgrade selectable control 234, enabling the user 232 to upgrade a user account associated therewith at any time while interacting with the user interface 228.

Figure 3:
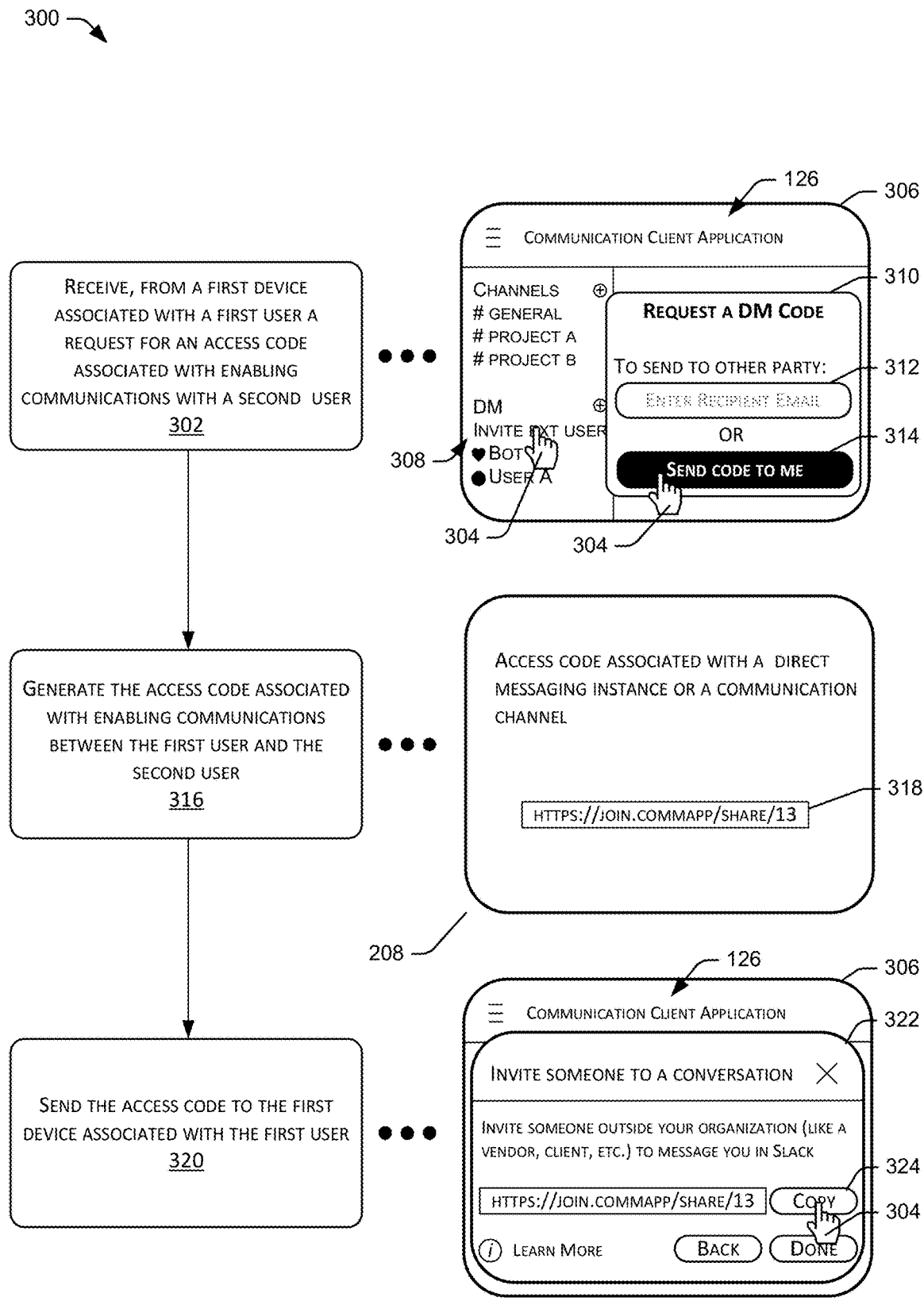
FIG. 3 illustrates an example process for providing an access code associated with enabling communications via a communication platform.

FIG. 3 illustrates an example process 300 for providing an access code associated with enabling communications between users. The process 300 may be performed by one or more computing devices associated with a communication platform, such as server(s) 102.

At operation 302, the communication platform receives, from a first computing device associated with a first user 304 associated with the communication platform, a request for an access code associated with enabling communications with a second user, such as user 232. In various examples, the request may be received via a user interface 306 associated with a communication client application 126 (e.g., an instance of the communication application 116), such as user interface 128. The user interface 306 may include an interface including enhanced functionality. Based in part on the enhanced functionality (and/or organizational settings associated with the communication client application 126), the user interface 306 may include a selectable control 308 associated with requesting an access code for enabling communications with other users associated with other organizations.

In various examples, responsive to the first user 304 selecting the selectable control 308, the communication platform may cause a window 310 to surface on the user interface 306. In some examples, the window 310 may include a request for additional information associated with the access code. In the illustrative example, the window 310 includes a first option 312 for the first user 304 to include an email address associated with a recipient (e.g., second user) of the access code and a second option 314 for the first user 304 to receive the access code. In other examples, the window 310 may include additional or alternative options, such as an input for a name, organization, or other information associated with a second user.

In various examples, responsive to the first user 304 selecting the first option 312 (inputting the recipient email), the communication platform may generate the access code and send an invitation including the access code directly to a second user.

In the illustrative example, the first user 304 selects the second option 314. At operation 316, based at least in part on receiving an indication of selection of the second option 314, the communication platform may generate an access code 318. In the illustrative example of FIG. 3, the access code 318 includes a link (URL) associated with an invitation to communicate with the first user 304. In other examples, the access code may include a QR code or other type of discrete code that identifies at least the first user 304 and/or the first user profile for establishing a new communication link, such as a communication channel or direct messaging instance.

At operation 320, the communication platform may send the access code 318 to a first computing device associated with the first user 304, such as a user computing device 104. In various examples, the communication platform may cause a second window 322 to surface via the user interface 306 associated with the communication client application 126. In various examples, the communication platform may cause the access code 318 to be stored in a user profile associated with the first user 304, accessible via the user interface 306. In various examples, one or more access codes 318 may be stored and/or accessible via the user interface 306. In such examples, the first user 304 may share the codes with others with whom the first user 304 desires to communicate quickly and efficiently.

In various examples, the second window 322 may include a selectable control 324 to copy the access code 318. In such examples, the first user 304 may be able to copy and paste the access code 318, such as into another document or application. The first user 304 may then be provide the access code 318 to a second user, such as user 232, such as to quickly establish communications therewith. For example, the first user 304 may copy and paste the access code 318 into an email to be delivered to the second user. The first user 304 may thus be able to quickly and efficiently enable private, secure communications via the communication platform with the second user via email. For another example, the first user 304 may copy the access code 318 and paste the code into a business card template. The first user 304 may then be able to quickly and efficiently enable private, secure communications via the communication platform with the second user by sharing the business card, either in person or electronically, such as attached to an email.

By utilizing the techniques described herein, the first user 304 may establish the private, secure one-on-one communications via the communication platform in a quicker more efficient manner than traditional systems permit. Thus, the techniques described herein improve existing communication systems. Additionally, the communication platform stores data associated with each direct messaging instance, whether enabled or disabled. Thus, the communication platform may provide a single source via which the first user 304 may quickly and easily access stored data associated with communications with a plurality of different people. Accordingly, the techniques described herein may improve existing communication systems by providing the single storage source for data associated with a plurality of conversations.

Example User Interfaces

Figure 4:
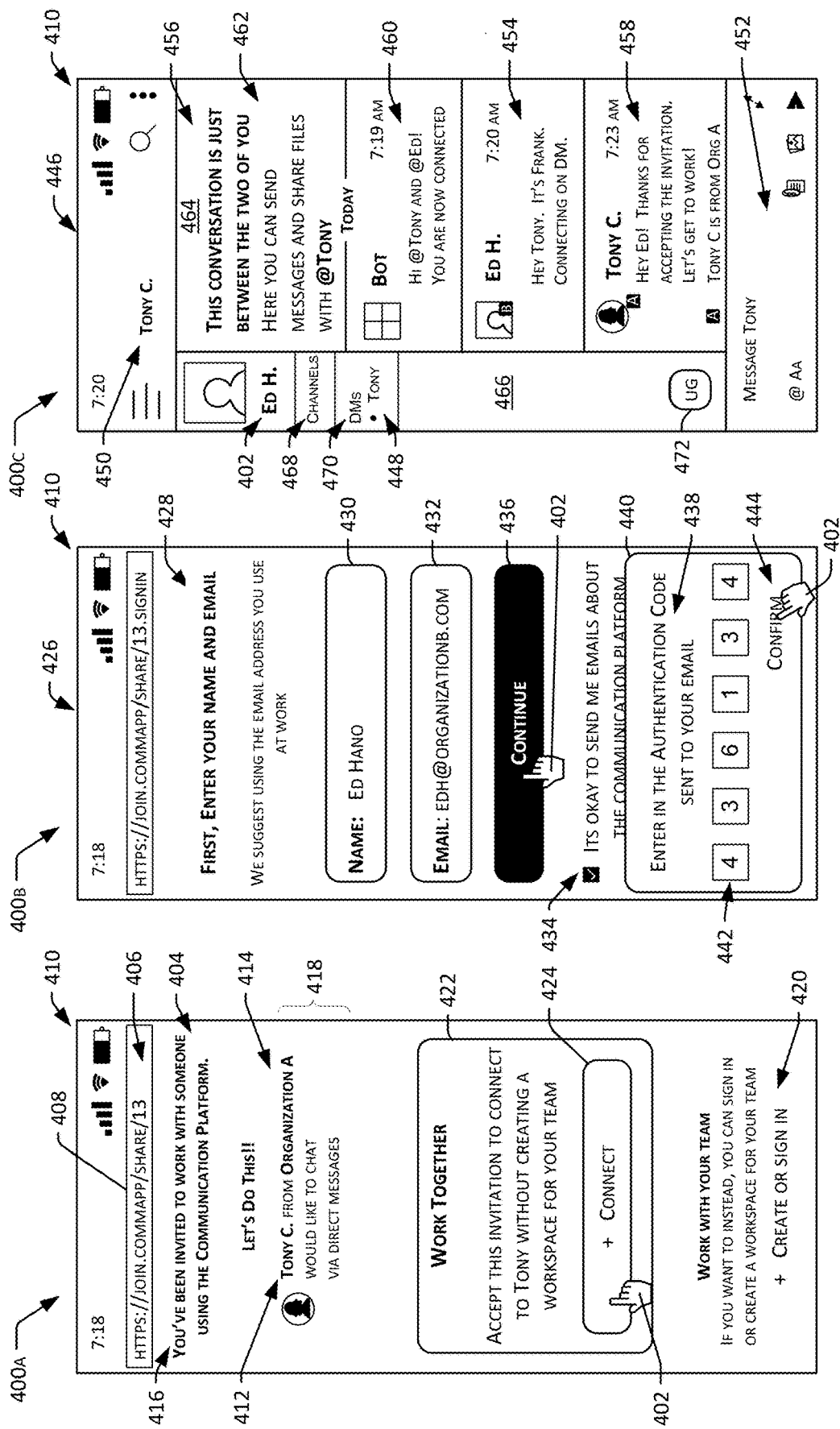
FIGS. 4A-4C illustrate example user interfaces corresponding to a user associating with a communication platform and accepting an invitation to communicate with another user via the communication platform.

FIGS. 4A-4C are schematic views showing example user interfaces that are usable to implement the techniques described herein for generating a limited functionality user interface. The interfaces may be generated by a computing device of a communication platform (e.g., server(s) 102, etc.) and transmitted to one or more user computing devices (e.g., user computing device(s) 104, user computing device 230, etc.) for presentation. Additionally or alternatively, the interfaces may be generated by the user computing device(s) based at least in part on instructions received from the communication platform. As discussed above, the interfaces described in this section may, but need not, be implemented in the context of the systems 100.

Interface 400A of FIG. 4A illustrate example interfaces corresponding to a second user 402 (e.g., second user 232, invitation recipient) accepting an invitation 404 to communicate via the communication platform. In the illustrative example, the second user 402 inputs an access code 406, such as access code 318, into an input box 408 associated with a web browser of the user computing device 410. In the illustrative example, the access code 406 is a URL associated with the communication platform. In other examples, the access code 406 may include a quick response (QR) code, a bar code, or other code configured to launch a communication application and/or website associated with the communication platform.

In some examples, the second user 402 may utilize a camera of the user computing device 410 to scan the access code 406. In some examples, the second user 402 may input the access code 406 by typing, dictating, or otherwise entering the link into the input box 408. In various examples, the access code 406 may automatically populate in the input box 408 responsive to selection (e.g., scan, selection of hyperlink, etc.) of the access code 406 by the second user 402.

As described above, the communication platform may generate the access code 406 responsive to a request from a first user 412, such as user 210, associated with a first organization 414, such as via an instance of a communication application managed by the communication platform. In some examples, the communication platform may provide the access code 406 directly to the second user 402. In various examples, the communication platform may provide the access code 406 to the first user 412. In such examples, the first user 412 may share the access code with the second user 402, such as to invite the second user 402 to communicate via the communication platform.

In some examples, the access code 406 may include a single use code. In such examples, the access code 406 may be used one time to generate a at least one of a communication channel or a direct messaging instance between the first user 412 and a second user, such as the second user 402. In some examples, the access code 406 may include a multi-use code. In such examples, the access code 406 may be used one or more times to generate one or more communication channels and/or direct messaging instances between the first user 412 and other users, such as the second user 402.

In various examples, the first user 412 may provide the second user 402 with the access code 406 electronically, such as via an email, social networking message, or the like. For example, the first user 412, Tony, may receive the access code 406 from the communication platform responsive to a request therefore and may send the access code 406 to the second user 402, Ed H., via email.

In various examples, responsive to receiving an indication that the access code 406 has been selected by the user 402, the communication platform may process a token associated with the access code 406 to determine the first user 412 associated therewith. The communication platform may cause the invitation 404 to be presented to the second user 402 based at least in part on the access code 406, the token, and/or the identified first user 412.

The invitation 404 may include a description 416 of the invitation. For example, the invitation 404 includes the description 416 that "You've been invited to work with someone using the communication platform." Additionally, in some examples, the invitation 404 may include an additional details 418 associated with the invitation. In the illustrative example, the additional details 418 include an identification (e.g., name) of the first user 412 (e.g., who provided the invitation), an identification of the first organization 414, and an indication that means of communication is a direct messaging instance. In other examples, the additional details 418 may include a workspace, communication channel, one or more other users, a project for collaboration between at least the first user 412 and the second user 402, and/or other data associated with the invitation.

In various examples, the invitation 404 may include an option 420 to for the second user 402 to sign-in to an existing account associated with the communication platform or create a new account with the communication platform. In various examples, the option 420 may enable the second user 402 to establish communications between the first user 412 and one or more members of a second organization of the second user 402. In various examples, if the second user 402 has an existing account with the communication platform, the second user 402 may select the option 420 to sign-in to the existing account. In some examples, if the second user 402 is not associated with an existing account of the communication platform, the second user 402 may select the option 420 to initiate a user account initialization process.

In various examples, responsive to receiving an indication that the access code 406 has been selected by the user 402, the communication platform may cause the user computing device 410 to present a window 422 to the second user. The window 422 may include a means by which the second user 402 may accept the invitation 404. For example, the window 422 may include a connect selectable control 424, enabling the second user 402 to accept the invitation 404. In various examples, responsive to receiving an indication of selection of the connect selectable control 424, the communication platform may cause an identification page to be presented to the second user 402 on a display of the user computing device 410, through which the second user 402 may provide the communication platform with identifying information about the second user 402.

Interface 400B of FIG. 4B illustrates an example identification page 426 presented to the second user 402 on the display of the user computing device 410. The identification page 426 may include a first instruction 428 for the second user 402 to enter a name and a user identifier. In the illustrative example, the user identifier includes an email address associated with the user. In other examples, the user identifier may include a phone number, social networking handle, or other identifier that is unique to the second user 402 (e.g., through which the second user 402 may be identified). In the illustrative example, the instruction 428 includes a suggestion to use an email address associated with an organization with which the second user 402 is associated. For example, the instruction 428 includes a suggestion to use "the email address you use at work."

In various examples, the identification page 426 may include a name input box 430 and a user identifier input box 432. In various examples, the second user 402 may input a name (e.g., legal name, nickname, username, etc.) into the name input box 430. For example, the second user 402 inputs the name "ED HANO" into the name input box 430, representative of a first and last name of the second user 402.

In various examples, the second user 402 may input the user identifier into the user identifier input box 432. In the illustrative example, the user identifier input box 432 includes a prompt for an email address associated with the second user 402. In other examples, the user identifier input box 432 may include a prompt for at least one of an email address, telephone number, social networking handle, or the like.

In various examples, the identification page 426 may additionally include a prompt 434 requesting permission to send communications regarding the communication platform via the user identifier. In the illustrative example, the second user checks the box associated with the prompt 434, authorizing the communications. In such an example, the communication platform may store a preference in association with a user profile of the second user 402 that communications are authorized. In other examples, responsive to the second user 402 not checking the box associated with the prompt 434, the communication platform may store a preference in association with a user profile of the second user 402 to not send communications via the user identifier.

In various examples, responsive to receiving a selection of a continue option 436 associated with the first instruction 428, the user computing device 410 may send the name and user identifier input via the name input box 430 and the user identifier input box 432, respectively. In various examples, responsive to receiving the name and user identifier, the communication platform may send an authentication code 438 to a user computing device, such as user computing device 410 associated with the user identifier. For example, the communication platform may send the authentication code 438 via the email "EDH@ORGANIZATIONB.COM." For another example, the communication platform may send the authentication code 438 to a telephone number provided via the user identifier input box 432, such as via text message.

In various examples, the communication platform may cause the user computing device to present a window 440 on the identification page 426 subsequently to or concurrently with sending the authentication code 438 to the second user 402. As illustrated, the window 440 may include an authentication input 442 via which the second user 402 may enter the authentication code 438. For example, the authentication code 438 sent to "EDH@ORGANIZATIONB.COM" is 436134. Though illustrated as all numbers, this is not intended to be limiting, and the authentication code 438 may include any number (e.g., more or less than six in the illustrative example) of numbers, letters, symbols, or the like.

In various examples, the window 440 may include a confirmation option 444, enabling the user to send the authentication code 438 to the communication platform for authentication (e.g., verifying the user identifier associated with the second user 402). In various examples, responsive to receiving the indication of selection of the confirmation option 444, the user computing device 410 may send the authentication code 438 to the communication platform. In some examples, the communication platform may, responsive to receiving an indication of selection of the confirmation option 444 and/or the authentication code 438, the communication platform may authenticate (e.g., verify) the user identifier and/or an association thereof with the second user 402.

In various examples, based at least in part on receiving user data (e.g., name, user identifier, etc.) associated with the second user 402, and/or authenticating the user data, the communication platform may generate the at least one of the communication channel or direct messaging instance associated with the invitation. For example, the first user 412, Tony, invites the second user 402, Ed, to communicate via a direct messaging instance. Responsive to receiving the user data and/or authenticating the user data, the communication platform may generate a direct messaging instance between Tony and Ed, thereby enabling communications therebetween via the communication platform. In some examples, the first user 412 may invite the second user 402 to communicate via a pre-existing communication channel In such an example, based on receiving the user data and/or authenticating the user data, the communication platform may associate the second user 402 with the pre-existing communication channel.

In various examples, based at least in part on receiving the user data associated with the second user 402, and/or authenticating the user data, the communication platform may determine whether the second user 402 is associated with the communication platform. In various examples, the communication platform may determine whether the second user 402 is associated with the communication platform based on a determination that a name and/or the user identifier associated with the second user 402 matches (or substantially matches) a name and/or user identifier associated with an existing user account, such as that stored in datastore in association with a user profile (e.g., in user/organizational data 134 of datastore 124).

Based on a determination that the second user 402 is associated with the communication platform (e.g., the user data matches the existing user account), the communication platform may modify a user interface associated with the existing user account to include at least one of a communication channel or a direct messaging instance between the first user 412 and the second user 402 associated with the invitation. For example, if the second user 402 is identified as being an existing user associated with an existing user account, a direct messaging instance associated with the invitation is presented via the modified user interface. The user interface associated with the existing user account may include an interface with enhanced functionality, such as user interface 128 described with respect to FIGS. 1 and 2A.

Based on a determination that the second user 402 is not associated with the communication platform (e.g., the user data does not match an existing user account), the communication platform may generate a limited functionality user interface, such as user interface 228 described above with regard to FIG. 2B. In various examples, the communication platform may send the limited functionality user interface to the user computing device 410.

Interface 400c of FIG. 4C illustrates an example limited functionality user interface 446 associated with the communication platform. In some examples, the limited functionality user interface 446 may be associated with a communication client application on the user computing device 410. As discussed above, the communication client application may be a web-based or native application associated with the user computing device 410.

In some examples, the communication platform may generate the limited functionality user interface 446 responsive to receiving an acceptance of an invitation 404 to communicate via the communication application (e.g., communication platform) and determining that the second user 402 is not associated with the communication platform. In various examples, the communication platform may cause the user computing device 410 to present the limited functionality user interface 446 to the second user 402.

The limited functionality user interface 446 may include a functionality that is less than an enhanced functionality user interface, as described above with regard to user interface 128. In at least one example, the limited functionality user interface 446 may include the functionality to communicate with the first user 412 via the at least one of a communication channel or a direct messaging instance 448 (e.g., messaging interface 448) generated in response to the second user 402 accepting the invitation to communicate.

The interface 400c illustrates a messaging interface between the second user 402 and the first user 412. In the illustrative example, the limited functionality interface 446 includes a first indication 450 of the other party associated with the direct messaging instance 448 (e.g., first user 412). In some examples, the limited functionality interface 446 may include and a second indication that the first user 412 is associated with an organization that is different than an organization associated with the second user 402. For example, the second indication may include a square, diamond, or any other shape, symbol, color indicator, or combination used to represent a different organization for the second user 402.

Additionally or alternatively, the interface 400C may include a warning to indicate that the other party associated with the direct messaging instance is associated with a different organization from an organization of the second user 402. For example, the warning may indicate that "Tony is from Organization A. Take care sharing your files and sensitive information."

In various examples, the limited functionality interface 446 may include a drafting window 452. The drafting window 452 may provide a means by which the second user 402 may draft messages to the first user 412. For example, Frank may initiate a conversation with Tony by drafting a first message 454. Responsive to sending the first message 454, the communication platform may cause the first message 454 to be presented in a messaging window 456. The messaging window 452 may include a display of the messages associated with the direct messaging instance between Frank and Tony.

In various examples, responsive to receiving the first message 454 from the user computing device 410, the communication platform may cause the first message 454 to be presented to the first user 412 via the direct messaging instance 448 of the communication platform (e.g., such as via a second instance of the communication client application). In various examples, the communication platform may receive, from a computing device associated with the first user 412, a second message 458 sent via the direct messaging instance 448. The communication platform may cause the second message 458 to be presented in the messaging window 456, such as in a feed (e.g., chronological order).

In various examples, the messaging window 456 may additionally include a third message 460 generated by the communication platform, such as to transmit information to the second user 402 and/or the first user 412. In the illustrative example, the third message 460 includes an indication that the first user 412 and the second user 402 are connected via the direct messaging instance 448. In some examples, the third message 460 may include additional information about features associated with the direct messaging instance 448. For example, the third message 460 may include an indication that the direct messaging instance 448 is a "simple, pleasant, and productive space to get work done." For another example, the third message 460 may "messages and files may be shared" via the direct messaging instance 448.

In various examples, the messaging window 456 may include a description 462 of the direct messaging instance 448. In some examples, the description 462 includes an indication of the users associated with the direct messaging instance 448. For example, the messaging window 456 includes a description that "This conversation is just between the two of you." In some examples, the description 462 of the messaging window 456 may include an indication of features associated with the direct messaging instance 448. For example, the description 462 includes an indication that messages and files can be shared with the first user 412 via the direct messaging instance 448.

In various examples, the messaging window 456 may be presented in a second region 464, such as second region 218. In some examples, the limited functionality user interface 446 may additionally include a first region 466, such as first region 202, that includes indicators associated with a communication channel menu 468, such as communication channel menu 132 and/or a direct messaging instance menu 470, such as direct messaging instance menu 130. In various examples, the communication channel menu 132 may include indicators associated with one or more communication channels, such as communication channels 204 through which the second user 402 has been invited to communicate. In various examples, the direct messaging channel menu 130 may include indicators associated with one or more direct messaging instances, such as direct messaging instances 206 through which the second user 402 has been invited to communicate. As illustrated, the second user 402 is associated with a single direct messaging instance 448, though this is just an example, and is not intended to be so limiting. For example the second user 402 may be invited, such as by the first user 412 via an enhanced functionality user interface, to join a communication channel Responsive to receiving an indication of acceptance of the invitation to join the communication channel, an indicator associated therewith may be presented to the second user 402 in the communication channel menu 132.

In various examples, the limited functionality user interface 446 may be limited to enabling communications via one or more direct messaging instances or communication channels to which the second user 402 has been invited. For example, the limited user interface 446 illustrated in FIG. 4C is limited to enabling communications with the first user 412 via the direct messaging instance 448. In various examples, the limited functionality of the user interface 446 may not include one or more other functionalities described above with regard to an enhanced functionality user interface, such as the functionality to invite other users to join the communication platform, to create a communication channel, workspace and/or direct messaging instance, to name communication channels, workspaces, and/or direct messaging instances, to view unread messages, thread, and mentions and reactions, to search for channels and/or workspaces, to search for files, people, groups, etc., to associate and use third-party applications within the user interface, and/or to customize settings associated with the user interface, and/or other functionalities of a standard user account of the communication platform. In various examples, a standard user account may include an account that is associated with an organization and/or includes a subscription (e.g., paid or unpaid). The standard user account may include a more onerous onboarding (e.g., sign-up and/or set-up process.

In various examples, the limited functionality user interface 446 may include an upgrade option 472. The upgrade option 472 may enable the second user 402 to upgrade the user account, such as to access an enhanced user interface. In various examples, responsive to receiving an indication of selection of the upgrade option 472, the communication platform may initiate a standard user account initialization process. The standard user account initialization process may include the communication platform requesting data associated with the second user 402 and/or an organization (e.g., organization B) associated therewith. The organizational data may include user data associated with one or more other users of the organization (e.g., names, user identifiers, addresses, demographic data, etc.), an administrator identifier (e.g., name, account data, etc.), organizational preferences (e.g., security settings, restrictions on expedited communications (e.g., invitation codes authorized, invitation codes not authorized, associated users permitted to generate codes, etc.)), payment information, and other information used by the communication platform to generate a new organizational account.

Example Methods

FIGS. 3 and 5-7 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 5:
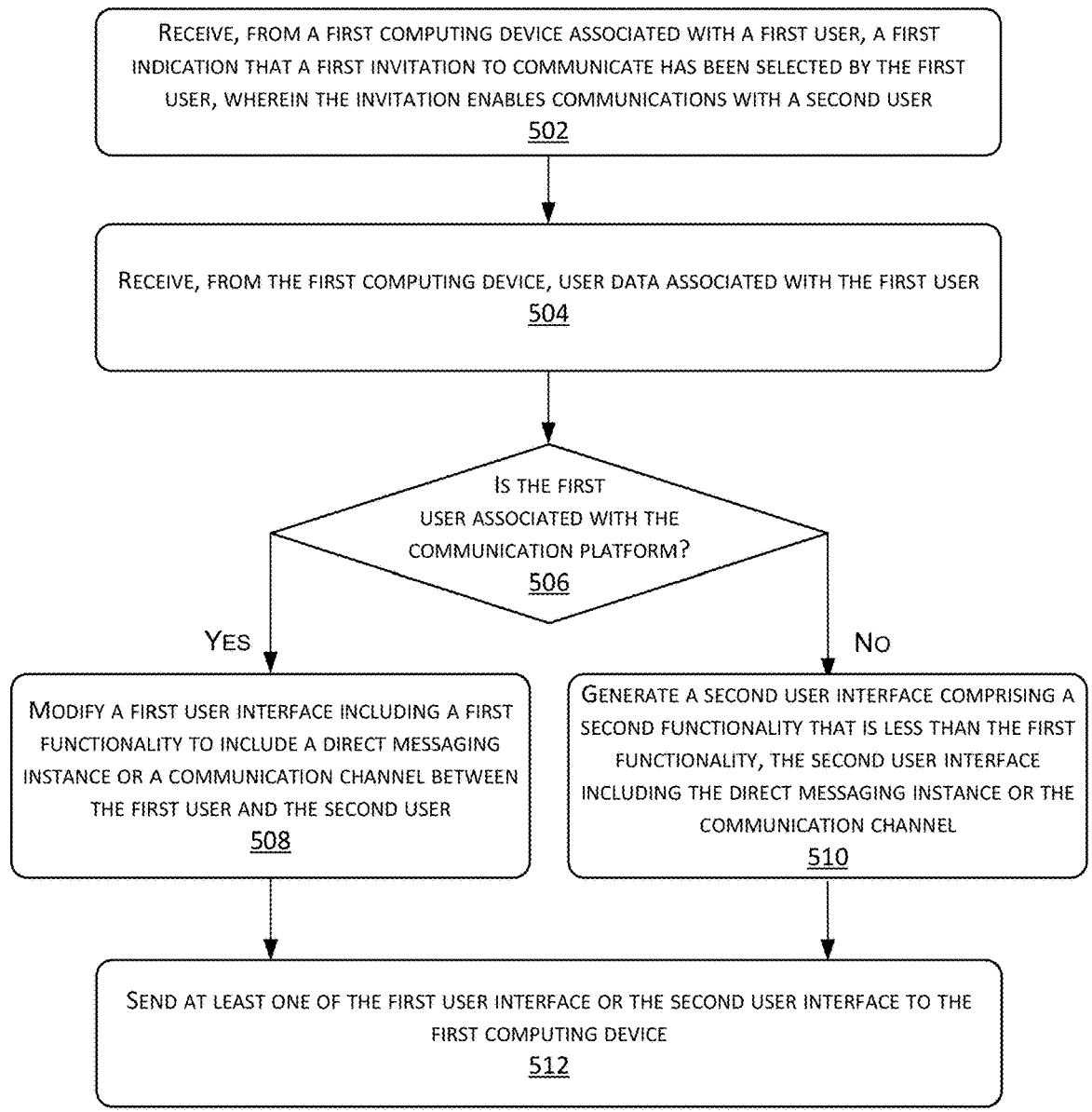
FIG. 5 illustrates an example process for generating a user interface for communicating via a communication platform, utilizing the techniques described herein.

FIG. 5 illustrates an example process 500 for generating a user interface for communicating via a communication platform. In some instances, some or all of process 500 may be performed by one or more components in the system 100. By way of example and not limitation, the communication platform referred to in process 500 may be representative of a computing device associated with the (communication platform) server(s) 102, the first user computing device referred to in process 500 may be representative of the user computing device(s) 104, and the second user device referred to in process 500 may be representative of a second computing device 104 and/or the user computing device(s) 410. However, the process 500 is not limited to being performed by the system 100.

At operation 502, the communication platform may receive, from a first computing device associated with a first user, a first indication that a first invitation to communicate has been selected by the first user, wherein the invitation enables communications with a second user. In various examples, the first indication may include an indication that the first user selected a link corresponding to an access code associated with the invitation. In some examples, the first indication may include an indication that the first user accesses a URL associated with the access code of the invitation. In some examples, the first indication may include an indication that the first user scanned a QR code, bar code, or otherwise accessed the access code associated with the invitation.

In various examples, based at least in part on the access code, the communication platform may identify the second user. In some examples, the communication platform may identify at least one of a communication channel or a direct messaging instance associated with the invitation, based on the access code. In various examples, the at least one of the communication channel or the direct messaging instance may include an existing communication channel and/or direct messaging instance. In such examples, an identifier associated with the existing communication channel and/or direct messaging instance may be associated with the invitation. In some examples, the invitation may include an invitation to communicate via a new communication channel and/or direct messaging instance between the first user and the second user.

At operation 504, the communication platform may receive, from the first computing device, user data associated with the first user. The user data may include a name, email address, telephone number, social networking handle, Internet Protocol address, user device identifier, or other means by which the second user may be identified. In at least one example, the user data includes at least a user identifier associated with the user (e.g., email address, telephone number, social networking handle, etc.).

In various examples, communication platform may receive the user data and/or an indication of selection (e.g., activation, scan, etc.) of the access code and may determine that the first user accepts the invitation to communicate via the communication platform. In various examples, responsive to determining an acceptance of the invitation, the communication platform may determine whether the at least one of the communication channel or the direct messaging instance associated with the invitation (e.g., with the access code) currently exists. In some examples, the determination of whether the at least one of the communication channel or the direct messaging instance exists may be based on an association with a communication channel identifier or direct messaging identifier with the invitation.

Based on a determination that the at least one of the communication channel or the direct messaging instance exists, the communication channel may associate the first user with the at least one of the communication channel or the direct messaging instance. Based on a determination that the at least one of the communication channel or the direct messaging instance does not currently exist, the communication platform may generate the at least one of the communication channel or the direct messaging instance.

At operation 506, the communication platform may identify whether the first user is associated with the communication platform. In some examples, an identification of association with the communication platform may be based on whether the user data matches (or substantially matches) an existing user account of the communication platform. The existing user account may include an account associated with an organization or a single-user account. The existing account may be associated with an enhanced functionality user interface or a limited functionality user interface.

Based on an identification that the first user is associated with the communication platform ("Yes" at operation 506), the communication platform may, at operation 508, modify a first user interface comprising a first functionality to include a direct messaging instance or a communication channel between the first user and the second user. The direct messaging instance or the communication channel may include the at least one of the communication channel or the direct messaging instance associated with the invitation.

The first functionality may include the enhanced functionality associated with the enhanced functionality user interface described above. For example, the first functionality may include an ability to invite other users to join the communication platform (e.g., join a workspace, a communication channel, a direct messaging instance, etc., to create a communication channel, workspace and/or direct messaging instance, to name communication channels, workspaces, and/or direct messaging instances (e.g., to customize and/or name for viewing by two or more organizations), to view unread messages, thread, and mentions and reactions, to search for channels and/or workspaces, to search for files, people, groups, etc., to use third-party applications within a communication client application, to customize settings associated with the communication client application and/or the first user interface, and the like.

Based on an identification that the first user is not associated with the communication platform ("No" at operation 506), the communication platform may, at operation 510, generate a second user interface comprising a second functionality that is less than the first functionality, the second user interface including the direct messaging instance or the communication channel In various examples, the second functionality may include the limited functionality associated with the limited functionality user interface described above.

In at least one example, the second functionality may include the functionality to communicate with the second user via the at least one of a direct messaging instance or a communication channel associated with the invitation to communicate (e.g., to which the first user is associated responsive to accepting the invitation to communicate, generated in response to the first user accepting the invitation to communicate, etc.). In such an example, the second functionality may include enabling communications (e.g., a means by which the first user may compose and/or read communications) including content transmitted between the first user and the second user via the communication platform.

At operation 512, the communication platform may send at least one of the first user interface or the second user interface to the first computing device associated with the first user. In some examples, the at least one of the first user interface or the second user interface may enable communications between the first user and the second user via the at least one of the communication channel or the direct messaging instance associated with the invitation.

FIG. 5 illustrates an example process 500 for generating a user interface for communicating via a communication platform. In some instances, some or all of process 500 may be performed by one or more components in the system 100. By way of example and not limitation, the communication platform referred to in process 500 may be representative of a computing device associated with the (communication platform) server(s) 102, the first user computing device referred to in process 500 may be representative of the user computing device(s) 104, and the second user device referred to in process 500 may be representative of a second computing device 104 and/or the user computing device(s) 410. However, the process 500 is not limited to being performed by the system 100.

FIG. 6 illustrates an example process 600 for modifying a user interface of a communication platform to include enhanced functionality. In some instances, some or all of process 600 may be performed by one or more components in the system 100. By way of example and not limitation, the communication platform referred to in process 600 may be representative of a computing device associated with the (communication platform) server(s) 102, the first user computing device referred to in process 600 may be representative of the user computing device(s) 104, and the second user device referred to in process 600 may be representative of a second computing device 104 and/or the user computing device(s) 410. However, the process 600 is not limited to being performed by the system 100.

At operation 602, the communication platform may receive, from a first computing device associated with a first user, a first input corresponding to acceptance of an invitation, wherein the invitation enables communications with a second user via the communication platform and the first input includes a first user identifier associated with the first user. In various examples, the first input may additionally include an indication that the first user selected a link corresponding to an access code associated with the invitation, an indication that the first user accesses a URL associated with the access code of the invitation, or an indication that the first user scanned a QR code, bar code, or otherwise accessed the access code associated with the invitation.

In various examples, based at least in part on the access code, the communication platform may identify the second user. In some examples, the communication platform may identify at least one of a communication channel or a direct messaging instance associated with the invitation, based on the access code. In various examples, the at least one of the communication channel or the direct messaging instance may include an existing communication channel and/or direct messaging instance. In such examples, an identifier associated with the existing communication channel and/or direct messaging instance may be associated with the invitation. In some examples, the at least one of the communication channel or the direct messaging instance may include a new communication channel and/or direct messaging instance between the first user and the second user, generated responsive to acceptance of the invitation. In such examples, the communication platform may generate the at least one of the communication channel and/or the direct messaging instance subsequent to or concurrently with receiving the first input corresponding to acceptance of the invitation.

At operation 604, the communication platform may determine, based at least in part on the first user identifier, that the first user is not associated with the communication platform or that the first user is associated with a limited functionality user interface. In some examples, the communication platform determines that the first user is not associated with the communication platform based on a determination that the first user identifier received in the first input does not match (or substantially match) an existing user account of the communication platform. In various examples, the communication platform determines that the first user is associated with a limited functionality user interface of the communication platform based on a determination that the first user identifier matches or substantially matches a user identifier corresponding to a single-user account including a limited functionality user interface.

At operation 606, the communication platform sends, to the first user computing device a first user interface including a direct messaging instance or a communication channel that enable the communications between the first user and the second user via the communication platform, wherein the first user interface comprises a first functionality. The first functionality may include a limited functionality that is less than an enhanced user interface associated with the communication platform.

In examples in which the first user is associated with an existing account, the first user interface may include a modified user interface associated with the existing account. In such examples, the modified user interface may include a user interface including the direct messaging instance or the communication channel associated with the invitation and one or more other direct messaging instances or communication channels associated with one or more previously accepted invitations.

In examples in which the first user is not associated with the communication platform, the communication platform may generate the first user interface responsive to determining that the first user is not associated with the communication platform (and based on the first input).

At operation 608, the communication platform may receive, from the first user computing device, an indication of selection of an upgrade selectable control associated with the first user interface. The upgrade selectable control may enable the first user to upgrade the first user interface to an interface with enhanced functionality user interface. In various examples, the upgrade selectable control may enable the first user to upgrade a user account associated therewith to an organizational account and/or a subscription account associated with the user (e.g., single user account including enhanced functionality).

At operation 610, the communication platform may send, to the first user computing device, a request for data associated with a full user account initialization process. In various examples, the request for data may include a request for organizational data. The organizational data may include user data associated with one or more other users of the organization (e g., names, user identifiers, addresses, demographic data, etc.), an administrator identifier (e.g., name, account data, etc.), organizational preferences (e.g., security settings, restrictions on expedited communications (e.g., invitation codes authorized, invitation codes not authorized, associated users permitted to generate codes, etc.)), payment information, and other information used by the server(s) 102 to generate a new organizational account.

In examples in which the user would like to upgrade a single-user account (e.g., not associated with an organization), the request for data may include a request for additional user data. The additional user data may include an address, one or more device identifiers (mobile identification number, international mobile subscriber identity, etc.), one or more contacts (e.g., personal associations, business associations, etc.), one or more professions, one or more skills, one or more hobbies, or the like.

At operation 612, based at least in part on a receipt of the data from the first user computing device, the communication platform may generate a second user interface including a second functionality, the second functionality being greater than the first functionality, and wherein the second user interface includes the direct messaging instance or the communication channel associated with the invitation.

In various examples, the communication platform may utilize the data to generate the full user account. In various examples, the communication platform may modify a limited user account (e.g., a user account associated with a limited functionality user interface) to the full user account. In examples in which the first user requests an organizational account (e.g., account associated with an organization), the communication platform may modify the limited user account to correspond to the organizational account.

At operation 614, the communication platform sends, to the first computing device, the second user interface. In various examples, the communication platform may cause the second user interface to be presented on a display of the first computing device.

Figure 7:
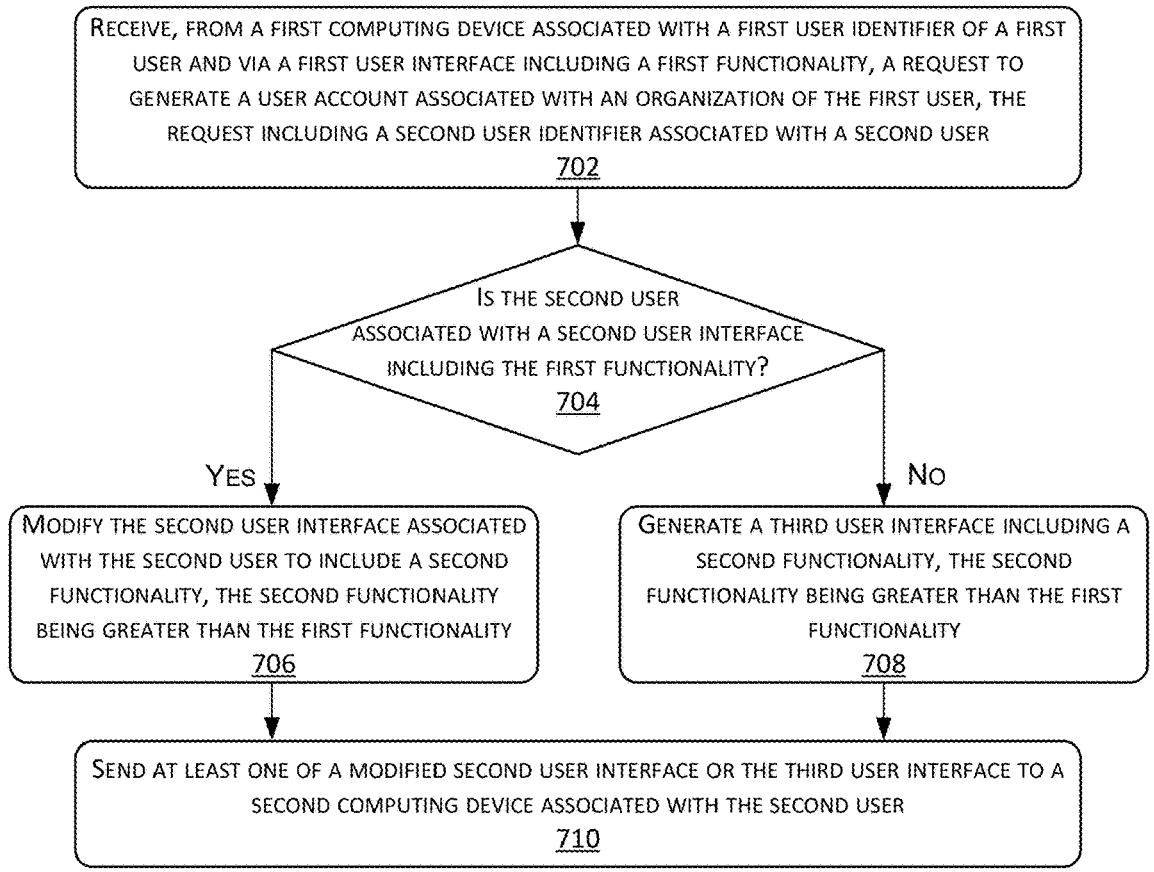
FIG. 7 illustrates an example process for generating a user account for an organization and providing user interfaces including enhanced functionality to users associated with the organization, utilizing the techniques described herein.

FIG. 7 illustrates an example process 700 for generating a user account for an organization and providing user interfaces including enhanced functionality to users associated with the organization. In some instances, some or all of process 700 may be performed by one or more components in the system 100. By way of example and not limitation, the communication platform referred to in process 700 may be representative of a computing device associated with the (communication platform) server(s) 102, the first user computing device referred to in process 700 may be representative of the user computing device(s) 104, and the second user device referred to in process 700 may be representative of a second computing device 104 and/or the user computing device(s) 410. However, the process 700 is not limited to being performed by the system 100.

At operation 702, the communication platform may receive, from a first computing device associated with a first user identifier and via a first user interface including a first functionality, a request to generate a user account associated with an organization of the first user, the request including a second user identifier associated with a second user. In various examples, the first functionality may include a limited functionality, such as functionality associated with a limited functionality user interface. In various examples, the request may be sent in association with a full user account initialization (or generation) process. In such examples, the full user account initialization process may include modifying the user interface from the limited functionality to an enhanced (second) functionality.

In various examples, the request may be initiated via an upgrade selectable control of a limited functionality user interface. In such examples, responsive to receiving an indication of selection of the upgrade selectable control, the communication platform may request data (e.g., organizational data, user data, etc.) from the user. In at least one example, the requested data may include user data associated with one or more other users of the organization (e g., names, user identifiers, addresses, demographic data, etc.). In some examples, the data may include other organizational data, such as data associated with one or more other users an administrator identifier (e.g., name, account data, etc.), organizational preferences (e.g., security settings, restrictions on expedited communications (e.g., invitation codes authorized, invitation codes not authorized, associated users permitted to generate codes, etc.)), payment information, and other information used by the server(s) 102 to generate a new organizational account.

At operation 704, the communication platform determines whether the second user is associated with a second user interface including the first functionality. In various examples, a determination of association with the second user interface may be based on whether the second user identifier (or substantially matches) an existing user account of the communication platform including the first functionality. The existing user account may include an account associated with a single-user account including the limited functionality user interface.

Based on an identification that the second user is associated with the second user interface ("Yes" at operation 704), the communication platform may, at operation 706, modify the second user interface associated with the second user to include a second functionality, the second functionality being greater than the first functionality.

The first functionality may include the enhanced functionality associated with the enhanced functionality user interface described above. For example, the first functionality may include an ability to invite other users to join the communication platform (e.g., join a workspace, a communication channel, a direct messaging instance, etc., to create a communication channel, workspace and/or direct messaging instance, to name communication channels, workspaces, and/or direct messaging instances (e.g., to customize and/or name for viewing by two or more organizations), to view unread messages, thread, and mentions and reactions, to search for channels and/or workspaces, to search for files, people, groups, etc., to use third-party applications within a communication client application, to customize settings associated with the communication client application and/or the first user interface, and the like.

Based on an identification that the second user is not associated with the second user interface ("No" at operation 704), the communication platform may, at operation 708, generate a third user interface including the second functionality.

At operation 710, the communication platform may send at least one of a modified second user interface or the third user interface to a second computing device associated with the second user. In various examples, the communication platform may cause the at least one of a modified second user interface or the third user interface to be presented on a display of the second computing device.

Figure 8:
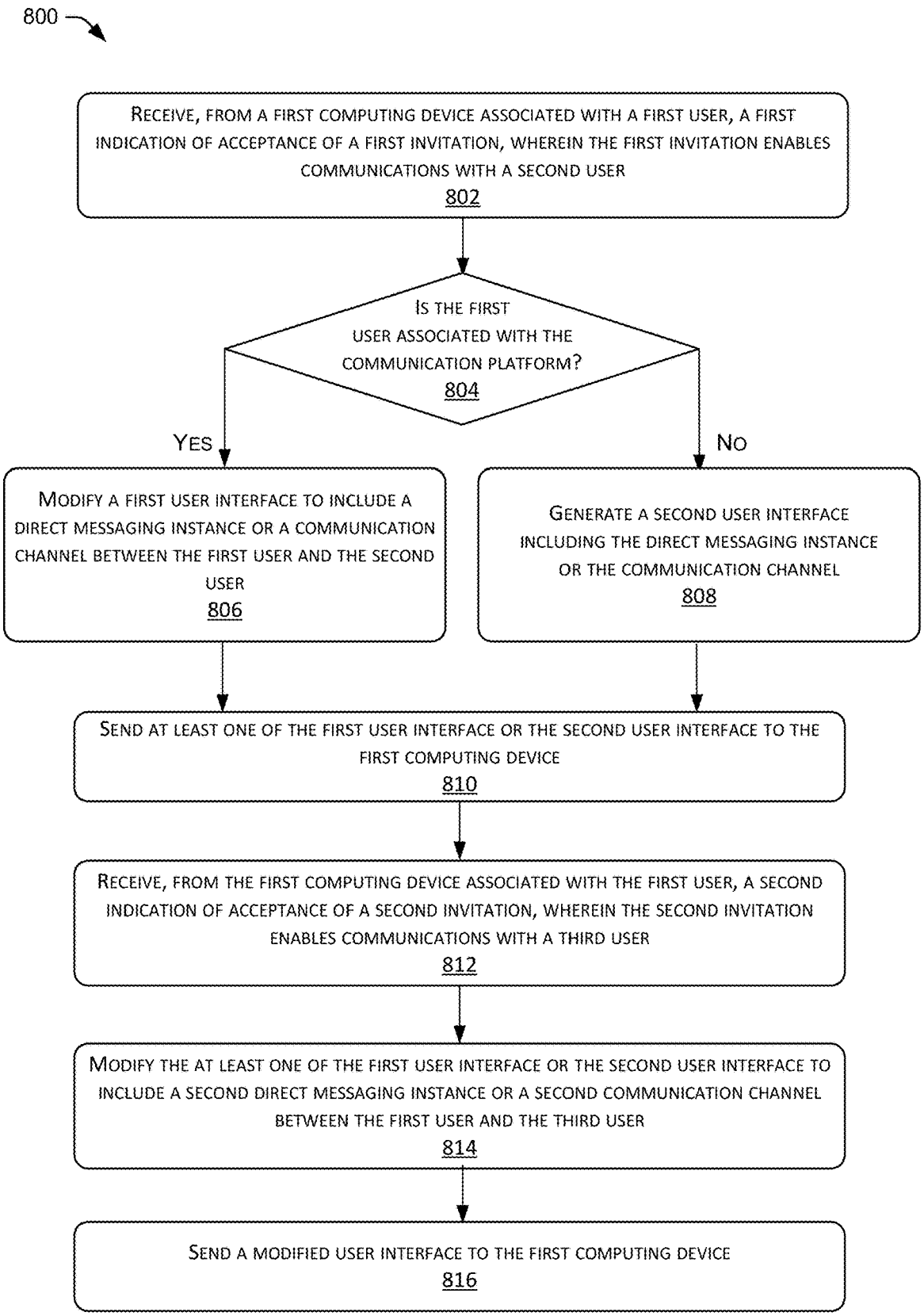
FIG. 8 illustrates an example process for modifying a user interface of a communication platform to include at least one of a communication channel or a direct messaging instance associated with an invitation, utilizing the techniques described herein.

FIG. 8 illustrates an example process 800 for modifying a user interface of a communication platform to include at least one of a communication channel or a direct messaging instance associated with an invitation. In some instances, some or all of process 800 may be performed by one or more components in the system 100. By way of example and not limitation, the communication platform referred to in process 800 may be representative of a computing device associated with the (communication platform) server(s) 102, the first user computing device referred to in process 800 may be representative of the user computing device(s) 104, and the second user device referred to in process 800 may be representative of a second computing device 104 and/or the user computing device(s) 410. However, the process 800 is not limited to being performed by the system 100.

At operation 802, the communication platform may receive, from a first computing device associated with a first user, a first indication of acceptance of a first invitation, wherein the first invitation enables communications with a second user. In various examples, the first indication of acceptance may include an indication that the first user selected a link corresponding to an access code associated with the first invitation. In some examples, the first indication of acceptance may include an indication that the first user accesses a URL associated with the access code of the first invitation. In some examples, the first indication of acceptance may include an indication that the first user scanned a QR code, bar code, or otherwise accessed the access code associated with the first invitation.

In various examples, the first indication of acceptance of the first invitation may include the communication platform receiving user data associated with the first user. The user data may include a name of the user, a user identifier (e.g., email address, telephone number, social networking handle, IP address, etc.), and/or other information associated with the first user. In at least one example, the user data includes at least a user identifier associated with the user (e.g., email address, telephone number, social networking handle, etc.). In various examples, communication platform may receive the user data and/or an indication of selection (e.g., activation, scan, etc.) of the access code and may determine that the first user accepts the invitation to communicate via the communication platform.

In various examples, based at least in part on the access code, the communication platform may identify the second user. In some examples, the communication platform may identify a first communication channel or a first direct messaging instance associated with the invitation, based on the access code. In various examples, the first communication channel or the first direct messaging instance may include an existing communication channel and/or direct messaging instance. In such examples, an identifier associated with the existing communication channel and/or direct messaging instance may be associated with the invitation. In some examples, the first communication channel or the first direct messaging instance may include a new communication channel and/or direct messaging instance between the first user and the second user, generated responsive to acceptance of the invitation. In such examples, the communication platform may generate the first communication channel and/or the first direct messaging instance subsequent to or concurrently with receiving the first input corresponding to acceptance of the invitation.

At operation 804, the communication platform may determine whether the first user is associated with the communication platform. In some examples, an identification of association with the communication platform may be based on whether the user data matches (or substantially matches) an existing user account of the communication platform. The existing user account may include an account associated with an organization or a single-user account (e.g., not associated with an organization). The existing account may be associated with an enhanced functionality user interface or a limited functionality user interface. For example, an existing user account associated with a single-user account may be associated with a limited functionality user interface.

Based on an identification that the first user is associated with the communication platform ("Yes" at operation 804), the communication platform may, at operation 806, modify a first user interface to include a direct messaging instance or a communication channel between the first user and the second user. The direct messaging instance or the communication channel may include the at least one of the communication channel or the direct messaging instance associated with the invitation.

In examples in which the first user is associated with an existing user account associated with an enhanced functionality user interface, the modified user interface may include the enhanced functionality user interface with the direct messaging instance or the communication channel. The first functionality may include the enhanced functionality associated with the enhanced functionality user interface described above. For example, the first functionality may include an ability to invite other users to join the communication platform (e.g., join a workspace, a communication channel, a direct messaging instance, etc., to create a communication channel, workspace and/or direct messaging instance, to name communication channels, workspaces, and/or direct messaging instances (e.g., to customize and/or name for viewing by two or more organizations), to view unread messages, thread, and mentions and reactions, to search for channels and/or workspaces, to search for files, people, groups, etc., to use third-party applications within a communication client application, to customize settings associated with the communication client application and/or the first user interface, and the like.

In examples in which the first user is associated with a limited functionality user interface, the modified user interface may include the direct messaging instance or the communication channel associated with the invitation and at least one other communication channel or direct messaging instance associated with a prior invitation (and acceptance thereof). The limited functionality user interface may include an interface with a functionality that is less than the enhanced functionality described above. In at least one example, the limited functionality user interface may be limited to the functionality to communicate via one or more communication channels and/or one or more direct messaging instances associated with one or more invitations.

Based on an identification that the first user is not associated with the communication platform ("No" at operation 804), the communication platform may, at operation 808, generate a second user interface including the direct messaging instance or the communication channel. In various examples, the second user interface may include a limited functionality user interface (e.g., including a second functionality that is less than a first functionality associated with an enhanced user interface)

In at least one example, the second functionality may include the functionality to communicate with the second user via the direct messaging instance or the communication channel associated with the invitation to communicate. In such an example, the second functionality may include enabling communications (e.g., a means by which the first user may compose and/or read communications) including content transmitted between the first user and the second user via the communication platform.

At operation 810, the communication platform may send at least one of the first user interface or the second user interface to the first computing device. In some examples, the at least one of the first user interface or the second user interface may enable communications between the first user and the second user via the direct messaging instance or the communication channel associated with the invitation.

At operation 812, the communication platform may receive, from the first computing device associated with the first user, a second indication of acceptance of a second invitation, wherein the second invitation enables communications with a third user. The second indication of acceptance may include an indication that the first user selected a second link corresponding to a second access code associated with the second invitation, an indication that the first user accesses a second URL associated with the second access code of the second invitation, and/or an indication that the first user scanned a QR code, bar code, or otherwise accessed the second access code associated with the second invitation.

In various examples, based at least in part on the second access code, the communication platform may identify the third user. In some examples, the communication platform may identify a second direct messaging instance or a second communication channel associated with the invitation, based on the second access code. In various examples, the second direct messaging instance or the second communication channel may include an existing communication channel and/or direct messaging instance. In such examples, an identifier associated with the existing communication channel or direct messaging instance may be associated with the second invitation. In some examples, the second invitation may include an invitation to communicate via a new communication channel or direct messaging instance between the first user and the third user.

Based on an identification that the direct messaging instance or the communication channel exists, the communication channel may associate the first user with the direct messaging instance or the communication channel Based on a determination that the direct messaging instance or the communication channel does not currently exist, the communication platform may generate the direct messaging instance or the communication channel.

In various examples, the second indication of acceptance of the second invitation may include the communication platform receiving the user data associated with the first user. In various examples, communication platform may receive the user data and/or an indication of selection (e.g., activation, scan, etc.) of the access code and may determine that the first user accepts the second invitation to communicate via the communication platform. In various examples, responsive to determining an acceptance of the second invitation, the communication platform may identify the first user as being associated with the communication platform (e.g., user data corresponds to a user account associated with an enhanced functionality user interface or a limited functionality user interface.

At operation 814, the communication platform modifies the at least one of the first user interface or the second user interface to include a second direct messaging instance or a second communication channel between the first user and the third user.

In examples in which the first user is associated with an existing user account associated with an enhanced functionality user interface, the modified user interface may include the enhanced functionality user interface with the second direct messaging instance or the second communication channel In examples in which the first user is associated with a limited functionality user interface, the modified user interface may include the second direct messaging instance or the second communication channel associated with the second invitation and the first direct messaging instance or the first communication channel associated with the first invitation and/or other prior invitations (and acceptances thereof).

At operation 816, the communication platform sends a modified user interface to the first computing device. The modified user interface may enable communications between at least the first user and the second user via the first direct messaging instance or the first communication channel and communications between the first user and the third user via the second direct messaging instance or the second communication channel In various examples, the modified user interface may include additional communication channels and/or direct messaging instances between the first user and one or more other users.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system associated with a communication platform, the system comprising:
   one or more processors; and
   one or more non-transitory computer readable media storing instructions that, when executed, cause the one or more processors to perform operations comprising:
      receiving a request to communicate with a first client associated with a first user, wherein the request to communicate is received from a second client associated with a second user and includes communicating via a direct messaging instance of the communication platform;
      generating, by the communication platform and based on the request, an invitation to communicate;

sending, from the communication platform, the invitation to the first client;

receiving, from the first client of the first user, an indication that the invitation has been accepted by the first user;

receiving, from the first client, a first user identifier associated with the first user;

generating, based at least in part on an identification that the first user identifier is not associated with the communication platform, a user account associated with the first user and with the communication platform, the user account comprising a user interface comprising the direct messaging instance configured to enable communication between the first user and the second user, wherein the user interface comprises a functionality;

determining, based at least in part on the user account, the functionality comprising disabling the first user from inviting other users to join the direct messaging instance; and causing display of the user interface in the first client.

2. The system of claim 1, the operations further comprising generating, based at least in part on the indication and the first user identifier, the direct messaging instance or a communication channel.

3. The system of claim 1, the operations further comprising:

receiving, from the first client and via the user interface, a selection of a selectable control to upgrade the user account associated with the communication platform;

sending, to the first client, a second request for organizational data associated with an organization of the first user;

receiving, from the first client, the organizational data;

modifying the user interface to comprise a second functionality; and sending a modified user interface to the first client.

4. The system of claim 3, the operations further comprising:

identifying, based at least in part on the organizational data, a third user associated with the organization;

accessing a second user account associated with the third user to identify that the third user has associated therewith a second user interface comprising the second functionality;

modifying the second user interface to comprise the functionality; and sending a modified second user interface to a third client associated with the third user.

5. The system of claim 1, the operations further comprising:

storing data corresponding to the direct messaging instance or a communication channel in association with the user account.

6. The system of claim 1, wherein:

a second functionality associated with a second user interface comprises at least one of:
   a first option to create a communication channel;
   a second option to search for the communication channel;
   a third option to create a second direct messaging instance;
   a fourth option to modify a name of the communication channel; or
   a fifth option to associate an application with the second user interface; and the functionality associated with the user interface does not comprise the at least one of the first option, the second option, the third option, the fourth option, or the fifth option.

7. The system of claim 1, the operations further comprising:

receiving, from the first client, a second indication that a second invitation to communicate via at least one of a second direct messaging instance or a second communication channel managed by the communication platform has been accepted by the first user, wherein the second invitation enables communications with a third user that is associated with the communication platform;

generating the at least one of the second direct messaging instance or the second communication channel;

based at least in part on a second identification that the user interface is associated with the first user, modifying the user interface to include the at least one of the second direct messaging instance or the second communication channel; and sending a modified user interface to the first client, wherein the modified user interface comprises the direct messaging instance and the at least one of the second direct messaging instance or the second communication channel.

8. A method, implemented at least in part by a server computing device associated with a communication platform, the method comprising:

receiving a request to communicate with a first client associated with a first user, wherein the request to communicate is received from a second client associated with a second user and includes communicating via a direct messaging instance of the communication platform;

generating, by the communication platform and based on the request, an invitation to communicate;

sending, from the communication platform, the invitation to the first client;

receiving, from the first client of the first user, an indication that the invitation has been accepted by the first user;

receiving, from the first client, a first user identifier associated with the first user;

identifying, based at least in part on the first user identifier, whether the first user is associated with the communication platform;

generating, based at least in part on whether the first user is associated with the communication platform, a user account comprising a user interface, the user interface comprising the direct messaging instance and a functionality associated with disabling the first user from inviting other users to join the direct messaging instances associated with the communication platform; and causing display of the user interface in the first client.

9. The method of claim 8, further comprising:

receiving, from the first client and via the user interface, a selection of a selectable control to upgrade the user account associated with the communication platform;

sending, to the first client, a second request for additional data associated with the first user, wherein the additional data comprises at least one of organizational data or user data associated with the first user;

receiving, from the first client, the additional data;

modifying the user interface to comprise a second functionality; and sending a modified user interface to the first client.

10. The method of claim 8, further comprising:
receiving, from the second client associated with the second user, a second request to generate the invitation associated with enabling communications with another user;
generating the invitation based at least in part on the second request; and
performing at least one of:
    sending the invitation to the first client of the first user, wherein the indication is received responsive to the invitation being accessed by the first user; or
    sending the invitation to the second client associated with the second user, wherein the indication is received responsive to the second user providing the invitation to the first user.

11. The method of claim 8, further comprising:
identifying whether the direct messaging instance associated with the invitation exists; and
performing at least one of:
    based on an identification that the direct messaging instance exists, associating the first user with the first direct messaging instance; or
    based on a second identification that the direct messaging instance does not exist, generating the first direct messaging instance to enable communications between the first user and the second user.

12. The method of claim 8, further comprising:
based at least in part on receiving the first user identifier, sending, to the first client an authentication code to the first user identifier;
causing an authentication window to be presented on a display of the first client; and
receiving an input comprising the authentication code via the authentication window,
wherein the user interface is sent to the first client based at least in part on the input.

13. The method of claim 8, wherein the user interface is sent to the first client, the method further comprising:
receiving, from the first client, a second indication that a second invitation to communicate has been accepted by the first user, wherein the second invitation enables communications with a third user that is associated with the communication platform;
modifying the user interface to include at least one of a second direct messaging instance or a second communication channel between the first user and the third user; and
sending a modified user interface to the first client, wherein the modified user interface comprises the direct messaging instance associated with the invitation and the at least one of the second direct messaging instance or the second communication channel associated with the second invitation.

14. The method of claim 8, further comprising:
storing data corresponding to the direct messaging instance in association with the user account.

15. The method of claim 8, wherein:
a second functionality associated with a second user interface comprises at least one of:
    a first option to create a communication channel;
    a second option to search for the communication channel;
    a third option to create a second direct messaging instance;
    a fourth option to modify a name of the communication channel; or
    a fifth option to associate an application with the second user interface; and
the functionality associated with the user interface does not comprise the at least one of the first option, the second option, the third option, the fourth option, or the fifth option.

16. One or more non-transitory computer readable media storing computer-executable instructions that, when executed by one or more processors of a computing device of a communication platform, cause the computing device to perform operations comprising:
receiving a request to communicate with a first client associated with a first user, wherein the request to communicate is received from a second client associated with a second user and includes communicating via a direct messaging instance of the communication platform;
generating, by the communication platform and based on the request, an invitation to communicate;
sending, from the communication platform, the invitation to the first client;
receiving, from the first client of the first user, an indication that the invitation has been accepted by the first user;
receiving, from the first client, a user identifier associated with the first user;
generating, based at least in part on an identification that the user identifier is not associated with the communication platform, a user account associated with the first user and with the communication platform, the user account comprising a user interface comprising the direct messaging instance configured to enable communication between the first user and the second user, wherein the user interface comprises a functionality associated with disabling the first user from inviting other users to join the direct messaging instance; and
causing display of the user interface in the first client.

17. The one or more non-transitory computer readable media of claim 16, wherein:
a second functionality associated with a second user interface comprises at least one of:
    a first option to create a communication channel;
    a second option to search for the communication channel;
    a third option to create a second direct messaging instance;
    a fourth option to modify a name of the communication channel; or
    a fifth option to associate an application with the second user interface; and
the functionality associated with the user interface does not comprise the at least one of the first option, the second option, the third option, the fourth option, or the fifth option.

18. The one or more non-transitory computer readable media of claim 16, the operations further comprising:
storing data corresponding to the direct messaging instance in association with the user account.

19. The one or more non-transitory computer readable media of claim 16, the operations further comprising:
receiving, from the first client and via the user interface, a selection of a selectable control to upgrade the user account associated with the communication platform;
sending, to the first client, a second request for additional data associated with the first user, wherein the additional data comprises at least one of organizational data associated with an organization of the first user or user data associated with the first user;

receiving, from the first client, the additional data;

modifying the user interface to comprise a second functionality; and sending a modified user interface to the first client.

20. The one or more non-transitory computer readable media of claim 19, the operations further comprising:

identifying, based at least in part on the additional data, a third user associated with the organization of the first user;

accessing a second user account associated with the third user to identify that the third user has associated therewith a second user interface comprising the second functionality;

modifying the second user interface to comprise the functionality; and sending a modified second user interface to a third client associated with the third user.

* * * * *